(12) United States Patent
Witkin et al.

(10) Patent No.: US 10,192,222 B2
(45) Date of Patent: Jan. 29, 2019

(54) INTERNET-BASED METHOD AND SYSTEM FOR MAKING USER-CUSTOMIZED DIE-CUT STICKERS

(75) Inventors: Andrew Witkin, Toronto (CA); Tamer El Shazli, Oakville (CA)

(73) Assignee: StickerYou Inc., Toronto (CA)

( * ) Notice: Subject to any disclaimer, the term of this patent is extended or adjusted under 35 U.S.C. 154(b) by 428 days.

(21) Appl. No.: 12/750,078

(22) Filed: Mar. 30, 2010

(65) Prior Publication Data

US 2010/0257210 A1    Oct. 7, 2010

Related U.S. Application Data

(60) Provisional application No. 61/164,746, filed on Mar. 30, 2009, provisional application No. 61/300,288, filed on Feb. 1, 2010.

(51) Int. Cl.
| | |
|---|---|
| G06F 7/00 | (2006.01) |
| G06Q 30/00 | (2012.01) |
| G06F 17/30 | (2006.01) |
| G06Q 30/06 | (2012.01) |

(52) U.S. Cl.
CPC ....... *G06Q 30/00* (2013.01); *G06F 17/30274* (2013.01); *G06Q 30/0601* (2013.01)

(58) Field of Classification Search
CPC .......... G06F 17/30477; G06F 17/3089; G06F 3/1285; G06Q 30/0621; G06Q 30/0635
USPC .............. 707/705, 602, 915, 999.2; 715/744, 715/764–765, 826, 866; 345/441, 467, 345/469.1, 470, 634, 636; 359/538; 705/14.1; 700/233
See application file for complete search history.

(56) References Cited

U.S. PATENT DOCUMENTS

| | | | | |
|---|---|---|---|---|
| 5,218,846 | A | * | 6/1993 | Cook et al. ........................ 70/56 |
| 5,615,123 | A | * | 3/1997 | Davidson et al. ............ 700/233 |
| 5,621,864 | A | | 4/1997 | Benade et al. |
| 5,829,790 | A | * | 11/1998 | Phillips ......................... 283/117 |
| 6,125,374 | A | | 9/2000 | Terry et al. |
| 6,167,382 | A | | 12/2000 | Sparks et al. |
| 6,256,039 | B1 | * | 7/2001 | Krishnamurthy ....... G06T 15/00 345/419 |
| 6,408,132 | B1 | | 6/2002 | Ishikawa |
| 6,452,596 | B1 | * | 9/2002 | Gueziec et al. .............. 345/440 |
| 6,565,607 | B1 | | 5/2003 | Cox |
| 6,619,166 | B2 | | 9/2003 | Miyazaki et al. |
| 7,011,230 | B2 | * | 3/2006 | Seo .................................. 221/1 |
| 7,032,179 | B2 | | 4/2006 | Mack et al. |

(Continued)

*Primary Examiner* — Tony Mahmoudi
*Assistant Examiner* — Linh Black
(74) *Attorney, Agent, or Firm* — Ridout and Maybee LLP

(57) ABSTRACT

An internet-based method and system is disclosed for creating and printing sheets of more customized stickers. The system includes, a database of assets stored on a central server accessible via the internet, wherein the assets are graphic images, objects and text that can be accessed and manipulated by a user at a remote location. A user interface provides the user with a canvas corresponding to the sheet of stickers, asset tools to access, select and save assets that are used to create the stickers, asset transformation tools to manipulate the assets on the canvas, and die-cut tools to create die-cut borders surrounding each of the stickers. The once the sheet of stickers has been created, the user can place an order for the sheet to be printed and delivered to the user.

9 Claims, 13 Drawing Sheets

(56) References Cited

U.S. PATENT DOCUMENTS

| | | | |
|---|---|---|---|
| 7,117,211 | B2 | 10/2006 | Whittingham et al. |
| 7,283,277 | B2 | 10/2007 | Li |
| 7,627,174 | B1 * | 12/2009 | Adams et al. ............ 382/173 |
| 2001/0011279 | A1 | 8/2001 | Hajjar |
| 2002/0031262 | A1 * | 3/2002 | Imagawa et al. ........... 382/190 |
| 2002/0054115 | A1 * | 5/2002 | Mack .................. G06T 11/60 715/765 |
| 2002/0175988 | A1 * | 11/2002 | Hoover ................. H04N 1/053 347/116 |
| 2003/0034991 | A1 | 2/2003 | Fitzsimons et al. |
| 2003/0140315 | A1 | 7/2003 | Blumberg et al. |
| 2004/0070587 | A1 * | 4/2004 | Cosman ................. G06T 17/20 345/620 |
| 2004/0083631 | A1 * | 5/2004 | Zakova et al. ............ 40/124.16 |
| 2004/0258201 | A1 * | 12/2004 | Hayashida ............ A61B 6/583 378/62 |
| 2005/0061430 | A1 * | 3/2005 | Frazer .................. 156/277 |
| 2005/0182693 | A1 * | 8/2005 | Alivandi ................. 705/27 |
| 2007/0034545 | A1 * | 2/2007 | Sabalaskey et al. ........ 206/575 |
| 2007/0097396 | A1 * | 5/2007 | Jacquot ................ G06F 11/324 358/1.13 |
| 2007/0115299 | A1 | 5/2007 | Barney et al. |
| 2007/0115300 | A1 * | 5/2007 | Barney et al. ............ 345/619 |
| 2007/0126226 | A1 * | 6/2007 | Kolodzie et al. ............ 283/72 |
| 2008/0162271 | A1 * | 7/2008 | Benjamin .................. 705/10 |
| 2009/0023487 | A1 * | 1/2009 | Gilson et al. .............. 463/11 |
| 2009/0122329 | A1 * | 5/2009 | Hegemier ............ G06T 11/60 358/1.9 |
| 2009/0185212 | A1 * | 7/2009 | Gustafson ............ G06Q 10/06 358/1.15 |
| 2011/0240739 | A1 * | 10/2011 | Delaigle ......... G06K 19/06037 235/454 |

* cited by examiner

Figure 15

INTERNET-BASED METHOD AND SYSTEM FOR MAKING USER-CUSTOMIZED DIE-CUT STICKERS

CROSS-REFERENCE TO RELATED APPLICATION

This application claims the benefit of U.S. Provisional Patent Application Ser. Nos. 61/164,746 filed Mar. 30, 2009 and 61/300,288 filed Feb. 1, 2010, the contents of which are incorporated herein by reference in their entirety.

FIELD OF THE INVENTION

This invention relates to an internet-based method and system for making user-customized stickers in both printing and cutting of the stickers.

BACKGROUND OF THE INVENTION

United States Patent Application 2007/0115299 published on May 24, 2007 disclosed methods and systems for generating graphics for motor vehicles that includes a user interface, such as an Internet website, which supplies the tools for allowing a user to generate customized graphics at the user's selection and discretion. The graphics are then positioned on a decal, sticker, mask, or similar medium for placement on the motor vehicle. A database containing selectable graphics components are accessible through the user interface, and these graphics may be combined, manipulated, modified, or selected as desired by the user to create customizable graphics. The system may also include tools that enable the user to import an electronic file containing an object or variant supplied by the user to be placed within the graphics field. Text may also be added to the overall graphics image. In one aspect, the system selects, based on the particular motor vehicle, the final shape of the graphics. Once the graphics are finalized, the system sends the image to memory, and once the user has placed an order for the sticker, the graphics are sent to an appropriate printer for printing of the final sticker.

In the methods and systems of United States Patent Application 2007/0115299, the shape and size of the final decal or sticker is predetermined based on the shape and size of the specific component of the motor vehicle on which the decal or sticker will be used.

U.S. Pat. No. 6,619,166 disclosed a method and apparatus in which an image to be printed is captured, and a cutting pattern for cutting the outer form of the image is selected from a plurality of predetermined cutting patterns. One or more images are printed in sizes and layout proper for the selected cutting pattern. The apparatus includes a cutter that cuts the recording paper in the desired cutting pattern. The method essentially includes the steps of capturing the image to be printed, selecting the cutting pattern from a set of predetermined cutting patterns, printing the captured image, cutting the outer form of the printed image in accordance with the selected cutting pattern.

U.S. Pat. No. 7,117,211 disclosed a system and method for ordering and producing labels in which the system includes a central server and database accessible via the internet. The system and method allows users at remote locations to make and order customized labels using various image data files and different templates or formats for a plurality of label types. The label image data is generated in a production file and then sent to remote locations for automatic label printing.

U.S. Pat. No. 5,621,864 disclosed a label generation apparatus that allows the user to customize labels having various sizes, shapes and characteristics. The labels may contain predetermined template fields having one or more writable indicia fields that can be used to provide each label with individual identifying indicia according to any predetermined sequence. The indicia can be alphanumeric characters, bar codes, colors, or any other writable indicia.

U.S. Pat. No. 6,408,132 disclosed a photo-sticker vending machine that includes memory for storing image data, a printer for the image data on a photo-sticker sheet, and a cutting device for cutting the photo-sticker sheet to a predetermined shape. The shape of the photo-stickers is predetermined depending on the size and shape of the portable telephone model for which the sticker is intended to be used. Once the user selects the portable telephone model, the user can create an image pattern that fits within the predetermined shape. After the final image is captured, the image pattern is printed and cut, and the printed and cut photo-sticker sheet is dispensed to the user. With this photo-sticker machine, the user selects the desired sticker shape from various predetermined shapes (the user selects the portable telephone model that he/she uses and the cutting data corresponding to the selected portable telephone model is automatically selected).

U.S. Pat. No. 7,011,230 disclosed an automatic star sticker vending machine in which the most recent image (photograph, an animation character, celebrity, popular person, performer, notable figure or the like) desired by that user is printed in the form of a sticker. The image may be modified by the user prior to printing. Once the image to be printed is set, the user can select a predetermined sticker shape for use with, for example, a cellular phone, accessory, doll, sticker book or the like.

U.S. Pat. No. 7,283,277 disclosed a method by which a border that incorporates user defined graphics can be added to any image prior to printing. The defined graphics can be repeatedly copied around an image to form the border.

There appears to be no disclosure in the art of an internet-based method and system that allows a user to create one or more high quality customized stickers, whereby the size and shape of the stickers is determined by the user.

SUMMARY OF THE INVENTION

Generally, one aspect of the present invention provides an easy-to-use method and system for producing high quality customizable stickers in both print and cutting (the shape of how the image is cut) for an inexperienced user to produce a custom sticker or series of custom stickers from any computer having access to the internet. The method and system also allows the user to use any number of unspecified images which can be uploaded from the user's computer, downloaded from any unified resource locator (URL), and/or downloaded or imported from the provider's protected assets. The method and system of the present invention provides a user interface, offline tools, API, services, and interoperability methods to create stickers, define and customize the die-cut of the sticker (shape of the sticker), automatically detect the die-cut of imported/uploaded images, combine and optimize the final die-cut and also provides the ability to create and order a combined sheet of variable stickers with customized shapes and die-cuts at once as a single order.

In another aspect, the present invention provides a method and system to facilitate and automate the process of automatically detecting the die-cut (shape) of any unspecified image or and/or object embedded within the sticker printing layer. The method and system of the present invention provides an automatic and cost-effective process of translating and generating the user's actions to produce the stickers into high-quality machine readable form that produces the final product in a mass production manner without (or with minimal) human intervention and manual labour.

In a further aspect, the present invention provides a method and system for producing stickers in any shape or form, from any number of objects, from any kind of objects (raster images (e.g. photos), vector images, text, drawing shapes, hand/free drawing), protecting any high resolution and protected assets (by means of conversion to screen resolution for the user tools), in a fully automated or semi-automated manner, in a cost effective manger of mass production of customized pieces per user.

In a preferred embodiment, the present invention provides a user interface in a network computerized environment comprising a central server that is accessible by a user via the internet from a remote location, the user interface allowing the user to create a sheet of one or more customized stickers, the user interface comprising: a canvas corresponding to the sheet of the one or more customized stickers, a plurality of assets stored in a database on the central server and accessible through the user interface, the assets comprising graphic images, objects and text that can be selected, accessed, combined, modified, transformed, altered or saved by the user, asset tools to allow the user to access, select and save desired assets that are used by the user to create the one or more customized stickers, asset transformation tools to allow the user to place the desired assets on the canvas, and to combine, modify, transform and alter the desired assets so as to create the one or more customized stickers, die-cut tools to create die-cut borders surrounding each of the one or more customized stickers created by the user, and an ordering tool to allow the user to order and print the sheet of customized stickers.

Preferably, the user interface may also comprise one or more of the following: a page layout tool to allow the user to resize, align or organize the one or more customized stickers on the canvas; an asset uploading tool to allow the user to import and upload a user-generated asset to the database on the central server; an asset alignment tool for automatically resizing, aligning and organizing the one or more customized stickers on the canvas; and means associated with one or more of the assets to prevent the user from combining, modifying, transforming or altering the one or more assets.

In another preferred embodiment, the present invention provides an internet-based method for creating and printing a sheet of one or more customized stickers, the method comprising the steps of: providing a central server that is accessible by a user at a remote location via the internet, the server comprising a database of assets wherein the assets comprise graphic images, objects and text that can be selected, accessed, combined, modified, transformed, altered or saved by the user, providing a canvas corresponding to the sheet of the one or more customized stickers, allowing the user at the remote location to select, access, combine, modify, transform, alter or save desired assets, creating the customized stickers by selecting, accessing, combining, modifying, transforming, altering or saving the desired assets, creating die-cut borders surrounding each of the customized stickers, and printing the sheet of the customized stickers.

Preferably, the internet-based method may also comprise one or more of the steps of: ordering the sheet of customized stickers prior to printing; resizing, aligning or organizing the one or more customized stickers on the canvas prior to printing; automatically detecting the one or more customized stickers and automatically creating the die-cut borders; importing and uploading a user-generated asset to the database on the central server; and automatically resizing, aligning or organizing the one or more customized stickers on the canvas.

In a further preferred embodiment, the present invention provides an internet-based system for creating and printing a sheet of one or more customized stickers, the system comprising: a central server that is accessible by a user at a remote location via the internet, a database of assets stored on the server, wherein the assets comprise graphic images, objects and text that can be selected, accessed, combined, modified, transformed, altered or saved by the user, a canvas corresponding to the sheet of the one or more customized stickers, asset tools to access, select and save desired assets that are used by the user to create the one or more customized stickers, asset transformation tools to place the desired assets on the canvas, and to combine, modify, transform or alter the desired assets so as to create the one or more customized stickers, die-cut tools to create die-cut borders surrounding each of the one or more customized stickers created by the user, and a printer for printing the sheet of the customized stickers.

Preferably, the internet-based system may also comprise one or more of the following: ordering tools to allow the user to order the sheet of customized stickers prior to printing; organizing tools to allow the user to resize, align or organize the one or more customized stickers on the canvas; means for automatically detecting the one or more customized stickers and automatically creating the die-cut border; uploading tools to allow the user to import and upload a user-generated asset to the database on the central server; means for automatically resizing, aligning or organizing the one or more customized stickers on the canvas; and means associated with one or more of the assets to prevent the user from combining, modifying, transforming or altering the one or more assets.

Most preferably, the die-cut tools allow the user to customize the shape and size of each of the die-cut borders; or the die-cut tools automatically detect the one or more customized stickers and automatically create the die-cut borders.

BRIEF DESCRIPTION OF THE FIGURES

The preferred embodiments of the present invention will be described with reference to the accompanying drawings in which like numerals refer to the same parts in the several views and in which:

FIG. 15 shows an example of the user interface for Mainform of one preferred embodiment of the method and system of the present invention.

DETAILED DESCRIPTION OF THE INVENTION

The preferred embodiments of the present invention will now be described with reference to the accompanying figures.

Figure 1:
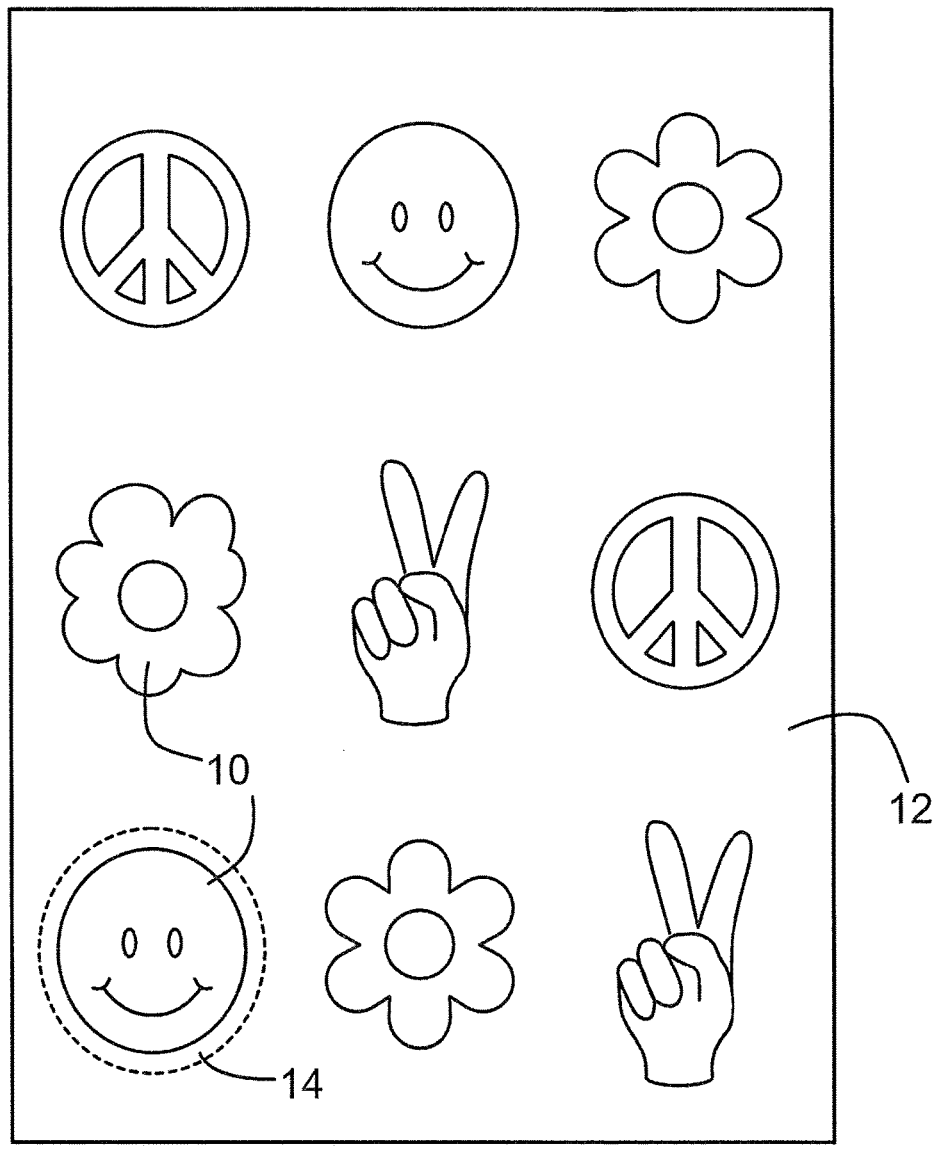
FIG. 1 illustrates a sample sheet of stickers made using a preferred embodiment of the method and system of the present invention.

One aspect of the present invention relates to an internet-based method and system for making user-customized stickers 10 (a sheet 12 of stickers 10 is illustrated in FIG. 1) wherein the method and system may provide one or more of the following features:

a. Allow the user to design a sheet 12 of stickers 10 in an easy and intuitive way;
b. Allow the user to order any number of stickers within the same sheet;
c. Allow the user to design a single or multiple stickers 10 with intuitive tools that perform sophisticated image processing operations without the knowledge by the user of how these processes are performed;
d. Provide to the user an automatically generated defined die-cut 14 (the physical shape of the sticker 10 outlining the shape of the image) by means of single action invocation that performs a complex procedure of actions to detect, enhance, simplify and generate the die-cut 14 of the sticker 10;
e. Accept any type of image and in any format by means of: uploaded image file by the user, imported image file from external sources, linked image file to external sources, serviced image file from external web services; and which will be processed according to its format and type and generate an automatically defined vector die-cut from either raster formatted image or vector formatted image. This feature allows the system implementing the subject patent to process any kind of uploaded images by the end user or imported/linked images to the system by means of web services, API, physical imports, etc. and benefit from the same benefits of assets belonging to the system;
f. Allow the user to browse, manipulate and use hi-resolution images and vector images in a unified way without compromising the security of the original images. This feature allows the user to use images that have sufficient resolution to use on the computer screen but do not have sufficient resolution to print directly from the application or to be reused into other applications; and
g. Allow the user to merge images and still be able to define a single die-cut 14 for the same sticker 10.

Figure 2:
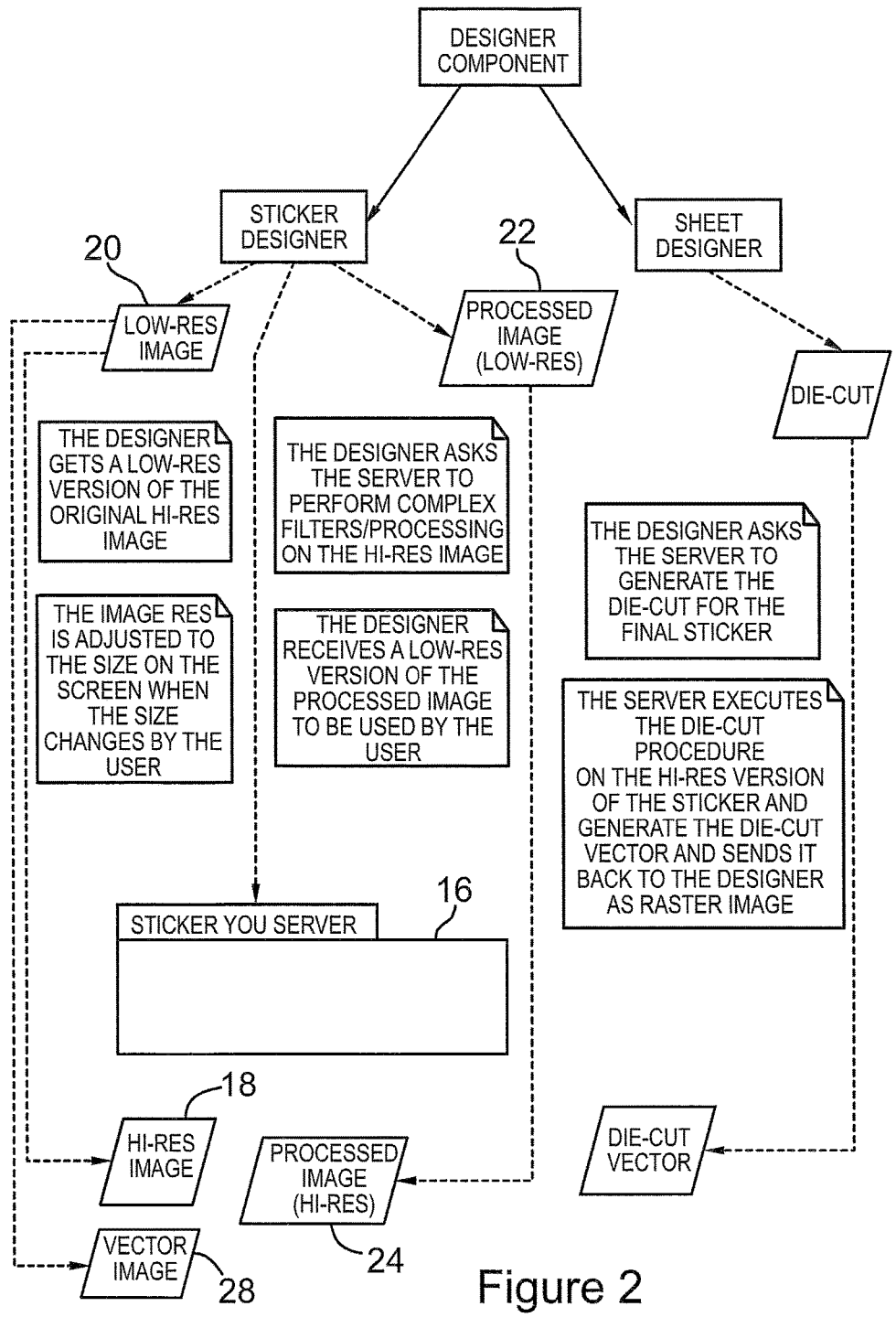
FIG. 2 describes how one preferred embodiment of the method and system of the present invention is designed and implemented.

FIG. 2 describes how one preferred embodiment of the method and system of the present invention is designed and implemented to provide the above features.

Technology Overview

In a preferred embodiment of the present invention, the method and system provide a 3-tier system:
Tier 1: the User Interface (creation tool),
Tier 2: the server application, and
Tier 3: the printer service application.
The platform may be implemented using the following established programs and technologies:
a. Microsoft.net framework;
b. Adobe Flex Builder 3;
c. Adobe Flash CS4;
d. Adobe Illustrator CS4;
e. Adobe Photoshop CS4;
f. Multiple open-source c# and c++ libraries, such as: AForge, GEOAPI, POTrace; and
g. Multiple open-source ActionScript 3.0 code libraries, such as Adobe's Cairngorm specification.

It will be understood, however, that other similar programs and technologies (including different versions of these) may be used to implement the preferred method and system of the present invention.

Tier 1: End-User Interface (Also Referred to as the "Sticker Creator")

In the preferred embodiment of the method and system of the present invention, the sticker creation section of the platform is a user interface that allows the user to import, link, create, and manipulate graphic images, objects and text. A user is able to drag assets (images, objects, etc., also referred to as "assets") onto a virtual stage (also referred to as a "canvas" and the words "stage" and "canvas" are used interchangeably in this specification) on the screen, and is able to change the size, color and positioning of the assets within the stage. The user may also add text to the assets and/or may add images and objects by drawing freehand on the stage. The programming processes detailed in the sticker creator section include:
a. Image uploads and imports;
b. Asset selection and accessing;
c. Detection of User Object Selection;
d. Image Transformation;
e. State management: saving and loading stickers;
f. Licensor enforced restrictions;
g. History States;
h. Image Masking;
i. Shape Creation;
j. Font Loading;
k. Alignment; and
l. Page layout.

a. Image Upload and Imports

The user interface (UI) includes tools that allow the user to import or upload any type and format of well-known images. The user can easily click on a button and locate an image file on his/her computer then upload that file. Once the upload process is complete, the user interface will trigger the second tier (server 16) to upload and import the uploaded file into its assets database. The second tier (server 16) will then process the file and create the necessary versions and die-cut of the asset (described in a later section). Once the asset is processed, it will be made available to the user interface to use within its stage and manipulated.

A similar pattern to this would be linking a file instead of uploading it. In this pattern, the second tier (server 16) will import a copy of the file from the source of the image and process it normally as an asset.

A well-known implementation of this pattern is the use of API and web services to import and create assets, and thus stickers, in real time.

b. Asset Selection and Accessing

From the user interface, the user can access and select multiple assets to include on the stage and can start to manipulate the selected assets. The tool allows the user to easily access any assets available on the platform through a series of calls to the second tier (server 16). All the assets accessible by the user are available in high resolution formats only 18 on the second tier (server 16). Once the user accesses an asset and adds it to the stage, the second tier (server 16) will send a variable low-res version of the image 20 (which is generated in run-time based on the user's user interface environment and needs). The user interface still links to the original asset by using a binary object representing the asset as an entity. The low-res image 22 manipulated by the user interface is a variable resolution image, that is, as the user manipulates the image using an asset transformation tool, the user interface will adjust the resolution of the image and acquire a new version 24 of the low-res image 20 from the second tier (server 16). This process allows the system to protect the high-res 18 original assets from piracy and copy, and protects the copyrights or trade-mark rights of the owner/licensor of the original asset.

The system is preferably configured such that the original asset and its high-res 18 version are inaccessible by any means of the user interface or external interfaces. Even if the user scales the asset to a large enough size, the second tier (server 16) will always send a low-res 20 version of the asset to the stage.

c. Detection of User Object Selection

Allowing easy access to the assets (images, objects, etc.) on the stage is paramount to creating a simple and fun environment in which to be creative. Native Flex technology allows for basic detection of mouse location and whether or not a mouse is 'over' a specific asset on the stage. However, when dealing with transparent and non-rectangular images or objects, this can get complicated and frustrating to the user, as it may appear that they are clicking on something when in fact their mouse click is being trapped by an image or object above it.

To address this difficulty, the preferred method and system of the present invention uses pixel level hit detection, capturing the x and y coordinates of the mouse click point and testing that against the visible pixels of each image or object on the stage until a match is found. In order to be as precise as possible, bitmap versions of the images or objects are generated and then the precise pixel region that the mouse is over is tested for the existence of pixel data. If no data is found, the hit test is re-done, using just the bounding box of the images or objects instead. If multiple matches are found, the match that has the highest depth (the image or object closest to the 'front' of the stage) is returned.

Once an image or object has been selected and returned, a selection box is drawn around the image or object to allow the user to manipulate it. This is described further in the following section on image transformation. In order to manipulate the image or object, the user performs multiple repeated mouse clicks. This may cause the user to inadvertently select another image or object or perform another unintended action. To counter this possibility, once an image or object is selected by the user, all remaining images or objects on the stage are removed from eligibility for mouse detection, until another selection is made.

d. Image Transformation

The asset transformation tool takes advantage of common algorithms and paradigms that are used in most image editing tools. Some of that include the standard 2-d transformation matrix and other complicated trigonometry and calculations. The preferred embodiment of the method and system of the present invention makes use of a pre-built set of classes to handle these calculations. The preferred embodiment of the present invention, however, includes more robust hit and selection detection algorithms to meet the needs of the preferred method and system, as outlined above.

The preferred method and system provides the user with an industry standard selection box and the ability to rotate, scale and move the selected image or object. This is done by altering the item's transformation matrix, and applying scaling and rotation to change the item's size and appearance.

This data is preferably recorded in order to re-apply the transformation when loading a saved state of the sticker from the second tier and the asset database. This is done by parsing out the matrix data and converting it to XML. Upon reload, the matrix is recreated and applied to the image or object.

e. State Management: Saving and Loading Stickers

The system follows an industry standard of using XML as the format of storing states of a sticker 10, a sheet 12 of stickers 10, layers within the stickers 10, and assets. The user interface serializes the state of the stage into a series of XML documents representing the state of the stage and the sticker 10. The user interface then sends the XML serialization to the second tier (server 16) to save the state of the sticker.

Upon loading a state of the sticker 10, the user interface acquires the XML serialization from the second tier (server 16) and then performs a reversing process which will de-serialize the XML into binary objects and renders them on the stage.

f. Licensor-Enforced Restrictions

The preferred method and system of the present invention also restricts a user's freedom of movement on an asset level in order to allow for copyrighted assets to be used without distortion or manipulation of those copyrighted assets. This also allows the system to ensure that all assets on a page will be properly aligned and simplifies the error-checking as no copyrighted assets can be rotated or distorted in any way once they reach a user's page. This is achieved by having the user interface send a signal to the second tier (server 16) every time an asset has been added or removed from the stage. This call (signal) sends a serialized XML version of the stage elements and will receive the applied restrictions on the stage based on the elements. The second tier (server 16) will run through the rules of the licensors and compiles a list of the restrictions that should apply to the stage (if any).

g. History States

With many capabilities and effects built into the stage, the preferred method and system of the present invention provides the user with the ability to undo or redo any changes previously made by the user. This is accomplished by adding a trigger for transformation updates from the above transformation management classes. Once the transformation manager triggers an update after an action has been completed, the preferred method and system updates the properties of all elements on the stage by recording the results of their transformations and property changes.

One issue surrounding the ability to undo is that one cannot simply use references to the objects in the collection of history states, otherwise when that reference is updated, the history is also updated and changes are lost. In order to accommodate this, the underlying data of each image or object is altered to include a method that essentially duplicates the properties of these items and stores them in an accessible format. This format is maintained for every action the user performs for each sticker 10, but to optimize performance, the format is cleared once that sticker 10 has been closed. The undo/redo aspect then becomes a simple cataloguing of the various formats of the sticker 10 and re-loading the assets with their properties from that particular format, while keeping them in a chronological index.

h. Image Masking

In the preferred embodiment of the present invention, the method and system provide the user with the ability to frame uploaded images and convert them to stickers 10 as this is expected to have mass appeal and to work very well in the existing system. With the selection system of the preferred embodiment in place, the method and system of the present invention allows for several modifications to accommodate the creation of masked objects and for the framing of images.

In these aspects, a customizable object is provided to separate the mask layer from the rest of the image, thus providing a place to put and store the user-uploaded content without it appearing over top of the rest of the frame. Once this layering is established, the method and system refers to the actual placeholder for the mask and uses Flex's native masking effects to eliminate the non-masked areas of the masked image.

Once masked, the user is given the ability to control either the mask or the frame, and in some cases the mask becomes completely invisible (similar to a simple circle mask) and therefore the user has no pixels to grab. To configure this to work with the preferred method and system of the present invention, the system checks and determines whether the mouse is over the masked object, and forces the selection to the mask first. The preferred method and system then provides a special icon that the user can click on to change the selection to the masked image itself. The system also binds the masked image to the frame's selection, so that the user can move both the frame and the masked image concurrently.

The final aspect of masking the image comes in detecting the masked area to determine whether or not to remove the mask. This involves overlaying the alpha channels of the image and the mask and checking for pixels with modified color data. If there are no pixels this means that the two images do not overlap and the mask is removed.

i. Shape Creation

The preferred method and system of the present invention includes a system where the initial drawing or shape is stored as a vector object 28 on the second tier (server 16) and the asset database, and both the second tier (server 16) and third tier, and the tool accurately reproduce the same shape given the same coordinates.

One source of difficulty is when a user manipulates a shape as though it were a regular object, through transformation. The preferred method and system of the present invention resolves this issue by taking the shape's matrix and applying it to the existing points, thus generating new coordinates, and then re-drawing the shape. These new coordinates are stored after every update and passes to the server 16. This means that the stored default shapes retain the same basic size, but a user can transform any shape and save it and it would remain transformed upon reloading.

j. Font Loading

The fonts used within the text application of the preferred method and system of the present invention are preferably licensed for commercial distribution, but the loading and management of the fonts are required to optimize the performance of the method and system while still keeping the quality of using embedded fonts.

In the preferred embodiment of the present invention, a solution to this issue is to use graphical previews to populate the list of fonts, thereby removing the requirement of having all fonts loaded in order to display a list of fonts in the typeface of the font they represent. This solution also involves embedding some of the Unicode characters of the font within separately compiled SWF files and loading them in as runtime assets when required.

k. Alignment

The preferred method and system of the present invention allows users to properly align objects on the stage in relation to other objects. While size would be important when dealing with fixed-width templates, most of the stickers 10 and sticker elements can be re-sized at the will of the user, and as such the system preferably aligns elements to each other rather than pre-set positions on the stage.

This alignment of elements is determined by object location, and activates when a user is actively 'moving' a selected object with the mouse. The alignment analyzes both the x and y planes, comparing each object's left and right edges, as well as the object's midpoint, against the dragged object's left and right edges and midpoint. If the coordinates are within a certain threshold, the object is 'snapped' to that position as a suggestion of location and a line is drawn, indicating to the user the intended finish position and alignment.

Once a snapping suggestion has been made, the system overrides the typical mouse movement to keep the item at the suggested position until a larger distance threshold has been reached, an indication that the user does not intend to use the suggested position. This process is also repeated on the y plane using each object's top and bottom edges and its horizontal midpoint.

l. Page Layout

In the preferred method and system of the present invention, page preview mode is where the user can re-size and organize their stickers 10 onto a page that corresponds to the sheet 12 for purchasing. Much of the same functionality of create sticker mode is also included here, but with further restrictions. Thus, this area of the preferred method and system allows the user to organize their page before printing. The programming processes detailed in this section include Sticker Navigation.

The source of the navigation layout comes from the page preview. Once a page is loaded, a copy of each sticker 10, including preview image, size and location, are dispatched to update the navigator. The navigator uses this information to generate a smaller version of the page with clickable links that launch the specified sticker into sticker creation mode. This data is updated with every change made to the page.

The navigator also highlights the sticker that is currently being edited and removes said highlight when that sticker is closed or the user returns to page view. This is done by updating a tracking variable and imposing an orange selection rectangle around the preview image.

Tier 2: The Server 16 Application

The server 16 application contains most of the image manipulation sequences, servicing the user interface, servicing the external API, servicing and importing and linking to external sources and the management of the asset database.

The programming processes detailed in the server application section include:
- a. Asset management;
- b. Rules and restrictions management;
- c. Asset anatomy (Layering) and reconstruction process;
- d. The generation of the die-cut;
- e. Die-cut as a template;
- f. Asset protection;
- g. Sticker state management;
- h. External interface service; and
- i. Checkout and ordering process.

a. Asset Management

Figure 3:
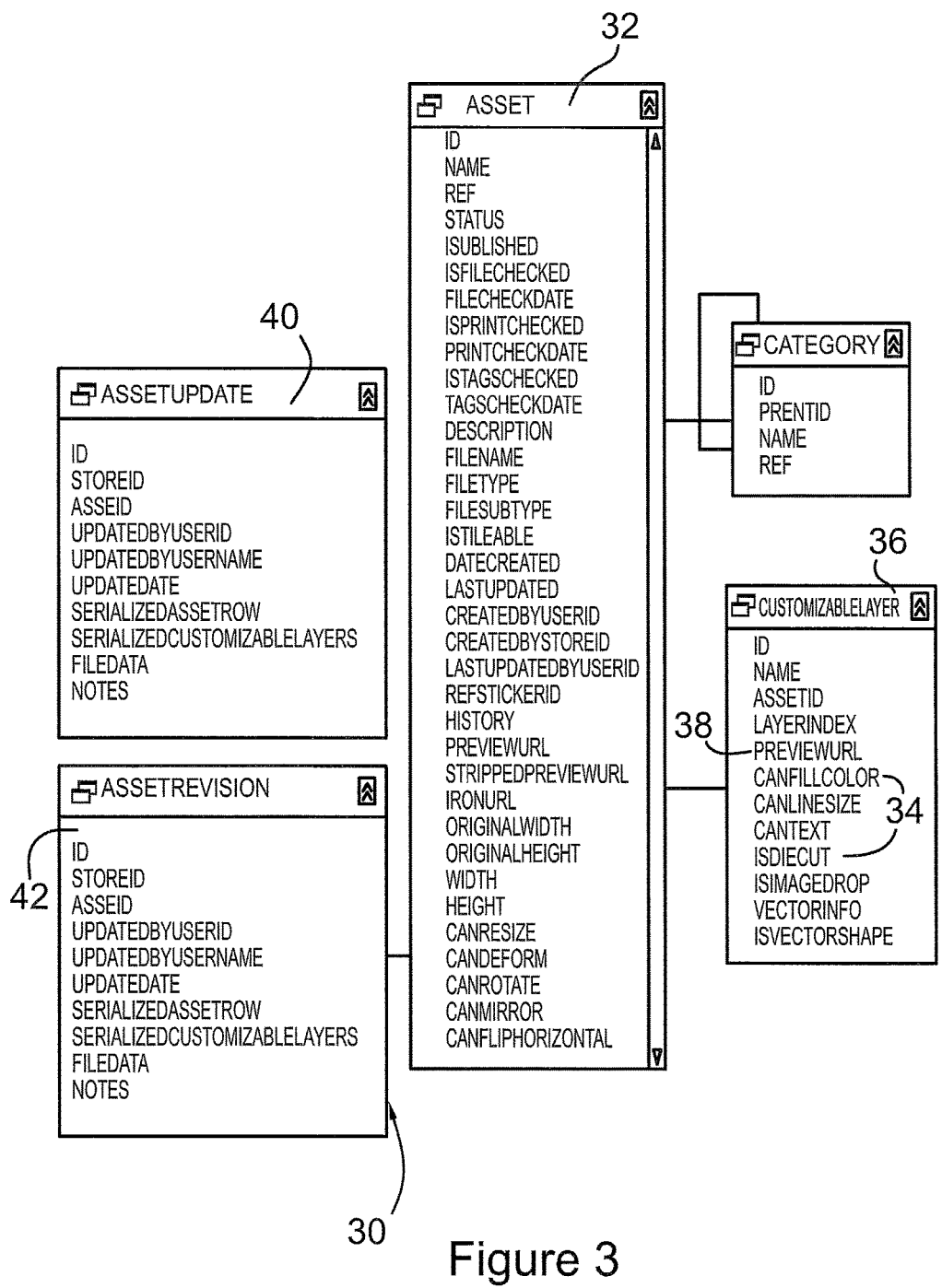
FIG. 3 depicts the database structure of the preferred method and system of the present invention.

All assets are stored in a centralized database containing the meta-data of the asset. The preferred method and system of the present invention uses the database structure as depicted in FIG. 3.

There is a unique record 30 stored in the database that represents an asset. The asset can be uploaded or imported into the database. Once an asset exists, the asset row 32 contains information about the asset, its owner, its type and any explicit restrictions on it. The system will then produce automatic records based on the asset structure and its anatomy. This process involves analyzing the original file of the asset and produce meta information about the asset. The process is described in detail in a later section. Once the asset is processed, a set or rows 34 in the table ("CustomizableLayer") 36 are produced accordingly. Those rows are derivative records that dictate the behaviour of the asset in terms of customization.

The process then generates multiple transparent high resolution images for the following:
- a. Asset as a whole: this image will be generated to represent the asset as a whole. The resolution that is taken of the asset is the smaller of either the maximum size of the rasterized asset or the maximum printing area multiplied by the maximum printing DPI (for example: 8.5"×11" sheet on 150DPI=1275×1650). The above formula will give the stored size of the asset which will be referred to hereinafter as the asset size.
- b. A snapshot of every customizable layer 36 of the asset at the asset size resolution.

Once all the images are produced, they will be stored and will be given a URL which will be stored in the field "PreviewUrl" 38 of the asset and each customizable layer 34. This process is important later on in the process of reconstruction of the asset inside of a sticker.

All asset revisions and asset history are stored as serialized XML format in the 2 tables: AssetUpdate 40 and AssetRevision 42. This allows the platform to revert back to any revision with full information in sync. The process of updating assets is done in a two-phase commit fashion: commit the changes to AssetUpdate 40 and then commit AssetUpdate 40 to Asset 32. This paradigm allows the platform to perform concurrent updates on the same asset from multiple users.

b. Rules and Restrictions Management

All assets carry on their restrictions and rules as one or more of the following:
- a. Explicit restrictions stored within the asset meta data. This includes restrictions such as: resizing, rotation, flipping, and deformation.
- b. Inherit restrictions. These restrictions are stored within the container folder (album or library) which propagate to the assets. These restrictions include: ability to mix with other library assets, ability to mix with text objects, and ability to mix with other types of objects.
- c. Asset Anatomy and Reconstruction Process The system provides two ways of importing assets:
- a. a layered asset (vector or raster layers), and
- b. a single layer raster image.

Figure 4:
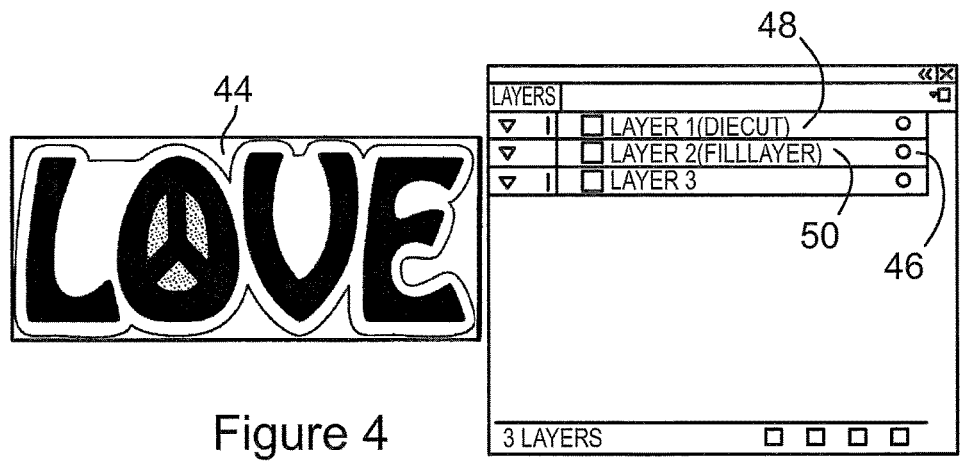
FIG. 4 shows an example of a multi-layer asset that consists of 3 layers.

Layered Asset:

The system provides a simple way for designers and artists to communicate and control the behaviour of the layers to the system via a simple naming convention embedded within the layer name referred hereinafter as "Directives". FIG. 4 shows a sample asset 44 with directives 46 embedded within it.

FIG. 4 shows an example of a multi-layer asset 44 that consists of 3 layers. The directives 46 are embedded within the names of the layers with rounded brackets. In the above examples, it uses the following directives: (DieCut) 48 and (FillLayer) 50. The following are some of the directives 46 that the system can support:
- a. DieCut 48: defines a layer that contains the vector representation of the proposed die-cut of the asset.
- b. FillLayer 50: defines a layer to become colorized by external dictation.
- c. LineColor: defines a layer to become colorized by external dictation and represents an outline.
- d. LineSize: defines a layer that can change its line thickness by external dictation.
- e. DynamicText: defines a text/vector layer that contains changeable text dictated externally.
- f. ImageDrop: defines a layer that can be used to mask another asset or part of asset into it.
- g. FillPattern: defines a layer that can be filled with a pattern represented by an asset or part of an asset.

Figure 5A:
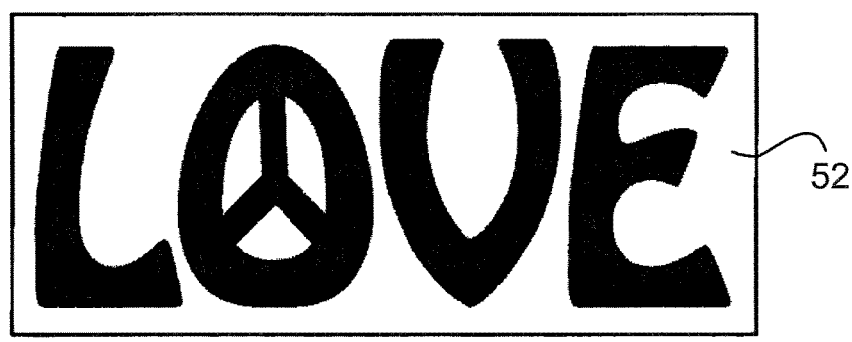
FIGS. 5a and 5b show the customizable Layers produced from the example of FIG. 3.
Figure 5B:
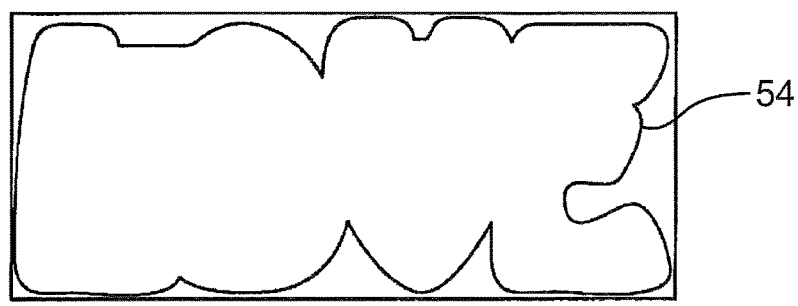

The system will then create a set of customizableLayers representing the different layers in the asset. If the asset does not have any layers with directives, the system will not create customizableLayers. In this setup, a layer can have multiple directives on it which will enable it to polymorph based on the directives. FIGS. 5a and 5b show the customizable Layers produced from the example of FIG. 4.

Figure 6:
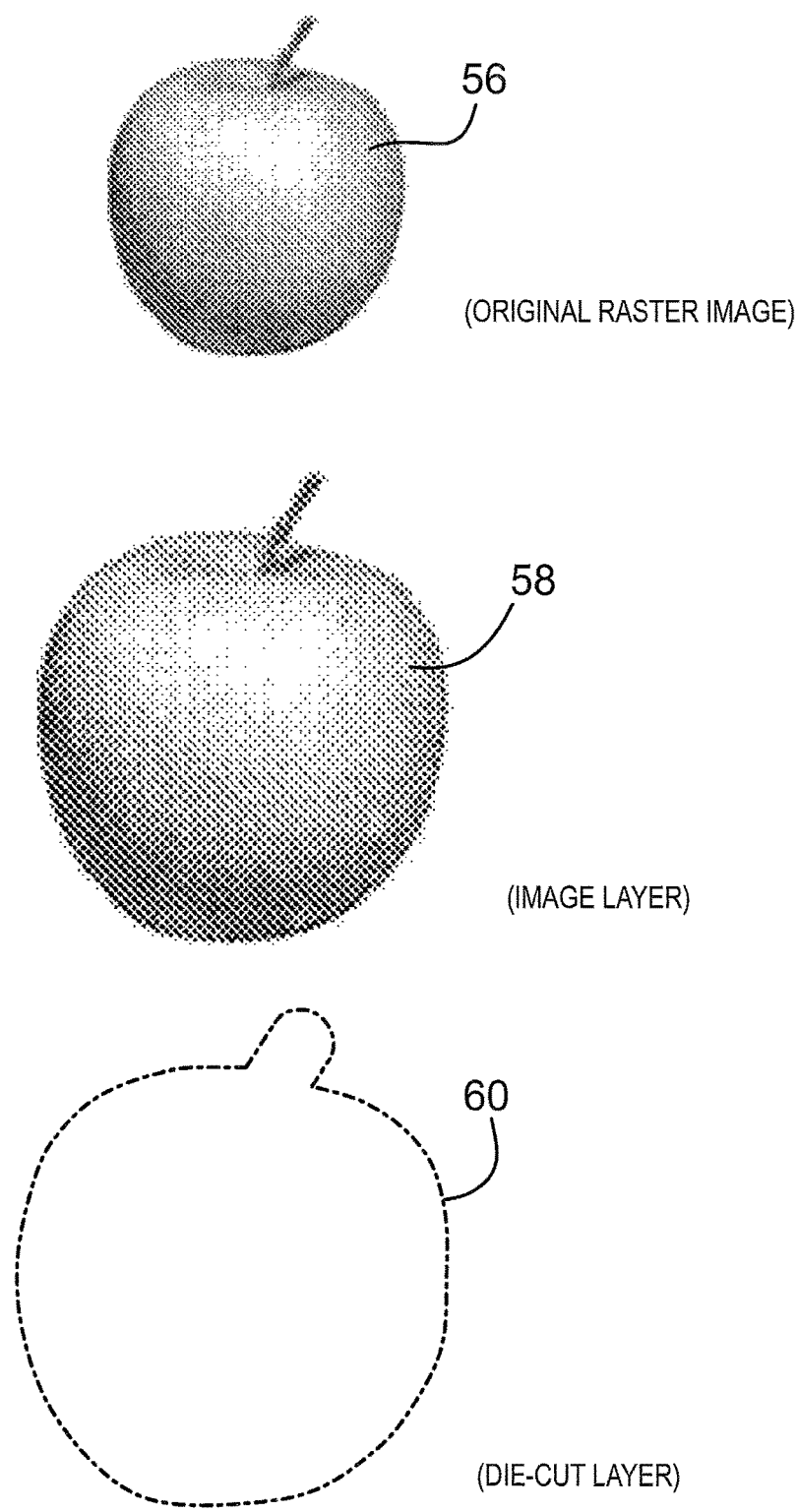
FIG. 6 illustrates an example of a raster image asset imported into the system.

Single Layer Raster Image:

FIG. 6 is an example of a raster image asset 56 imported into the system. In single layered raster image files 56, the system will create an additional customizableLayer 58 that contains the die-cut 60 data. The die-cut 60 data can be a simple rectangular shape that surrounds the image 56 or can be a detected die-cut which is described in a later section.

d. Generation and Detection of Die-Cut

The die-cut detection in the platform can occur in two ways:
- a. raster asset die-cut detection, and
- b. vector asset die-cut detection.

Each way is used in the platform corresponding to the type of asset it applies to. Both ways then merge into one single path to create the final die-cut.

Figure 7:
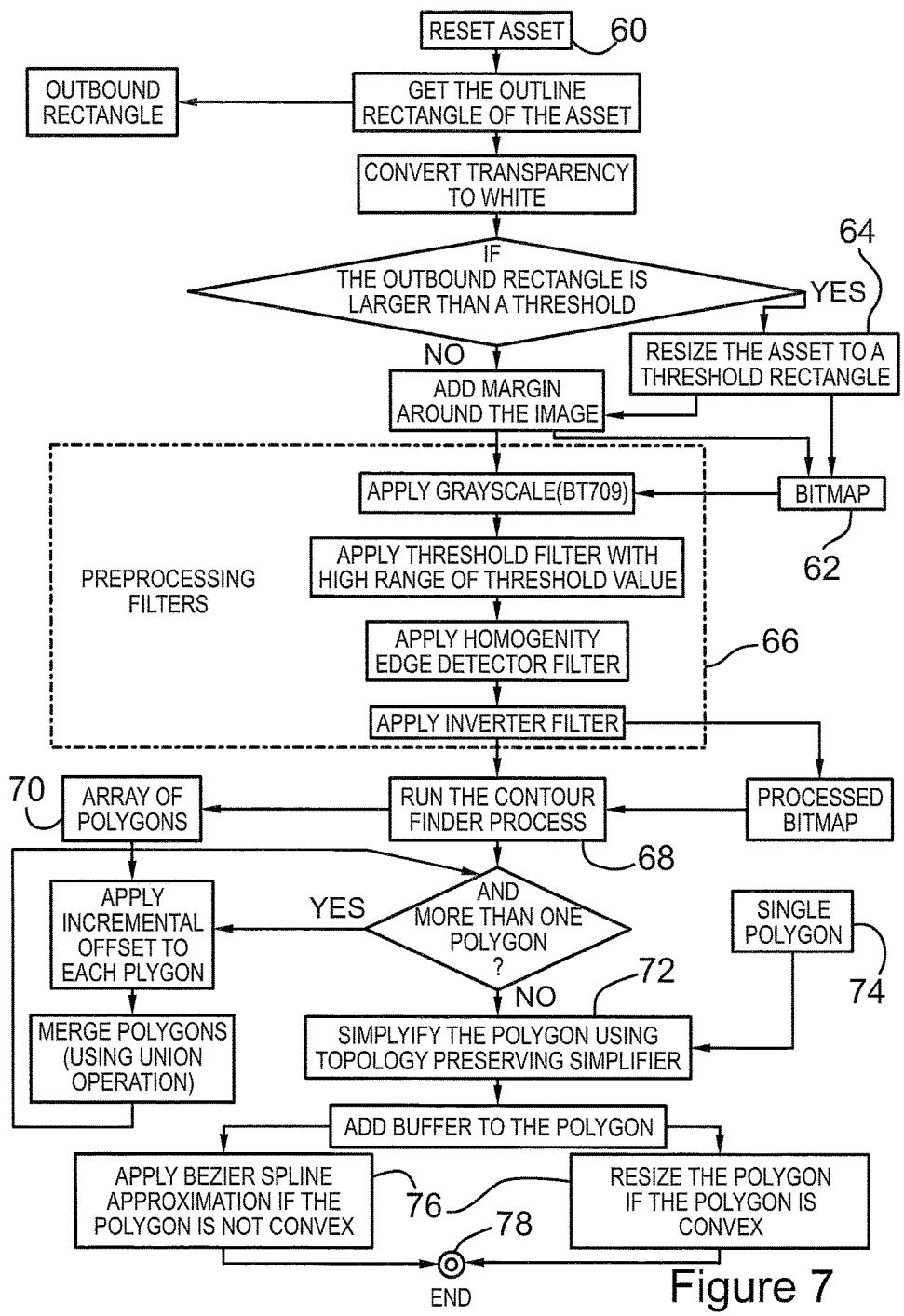
FIG. 7 illustrates the Raster asset die-cut detection system of one preferred embodiment of the method and system of the present invention.

Raster Asset Die-Cut Detection:

In raster assets, the asset is uploaded to the art bank without any information about what the die-cut would look like. The simplest way to create a die-cut from a raster image is to create a rectangle around the image. The system in this platform searches into the raster data of the image to detect the outer outline of the image by going through a series of processes. FIG. 7 outlines the sequence and the processes that the system goes through in order to do this. The process undergoes a series of processes as follow:

a. Convert the image file 60 to a raster bitmap format 62;
b. Resize 64 the bitmap 62 down to speed up the processing;
c. Apply a series of filters 66 on the bitmap to reduce noise and colors;
d. Use a pixel edge detection algorithm 68 on the bitmap to generate a set of polygons 70 corresponding to all closed shapes in the bitmap;
e. Simplify each polygon in the set generated using a polygon simplification algorithm 72;
f. Detect holes and eliminate them from the set;
g. Detect nominal polygons and eliminate them from the set;
h. Ensure that there is only one polygon 74 left in the set;
i. Apply a polygon smoothing algorithm 76 (POTrace is used in the platform) and convert to a geometric shape containing sets of Bezier curves; and
j. Finalize the shape 78.

Vector Asset Die-Cut Detection:

The preferred method and system of the present invention generates vector assets' die-cuts using the following process:

a. Each asset stored in the art bank is stored with meta data describing what each layer is;
b. Each asset is stored with the vector representation of the proposed die cut for the asset on its own; and
c. The die cut vector data is stored as a single path or collection of paths (which are Bezier curves series).

When the sticker 10 is created on the user interface, it consists of a collection of assets. Each asset must have its own proposed die cut vector information. That is, if an object is part of the art bank, it will contain the vector information as above. If the object is a raster asset, it will go through the die-cut detection described in the previous section. If the asset does not have any vector information for the die-cut, the preferred method and system will assume rectangle die-cut.

Figure 8:
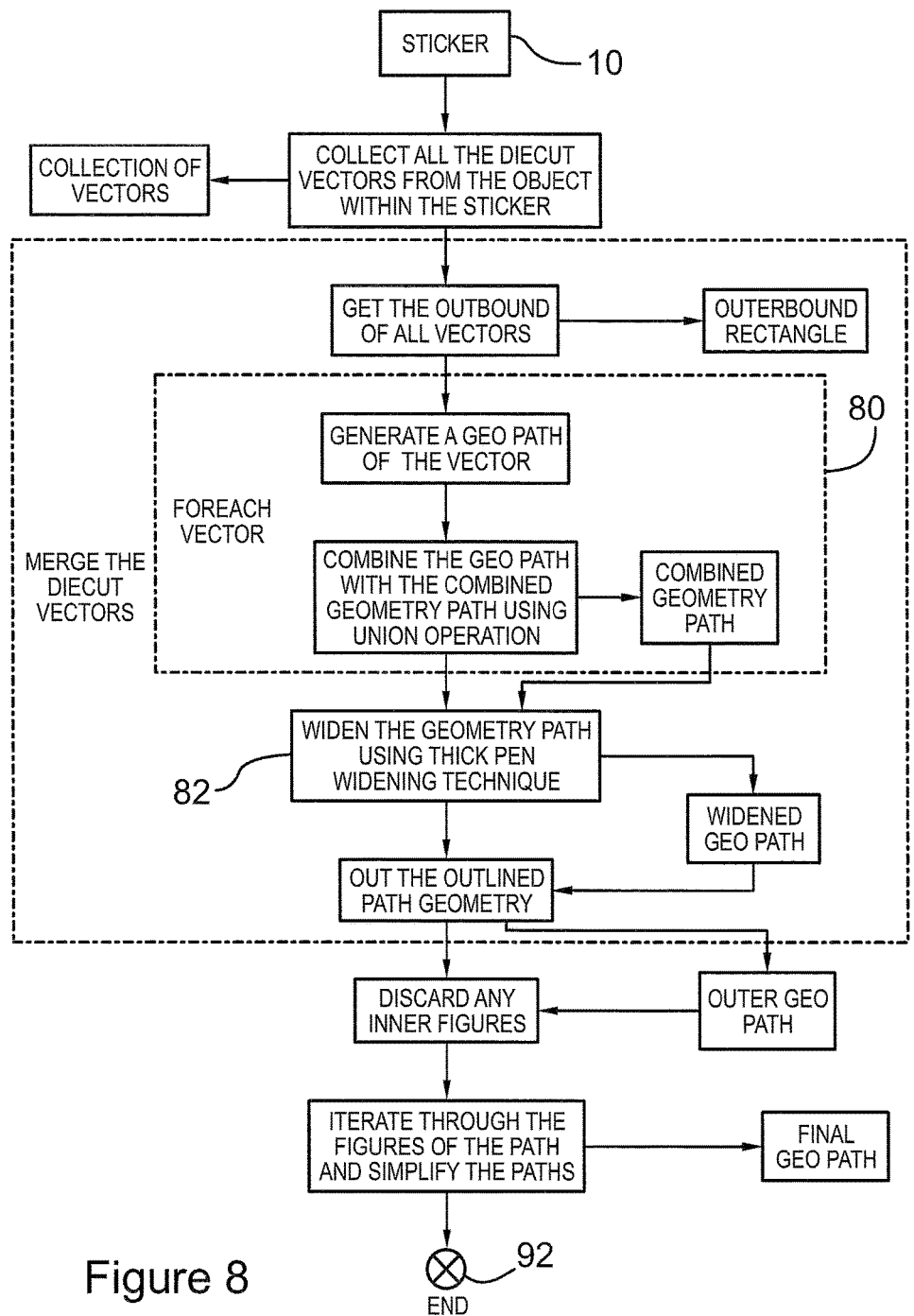
FIG. 8 illustrates the process of combining and detecting the die-cut of a collection of assets in one sticker of one preferred embodiment of the method and system of the present invention.
Figure 9:
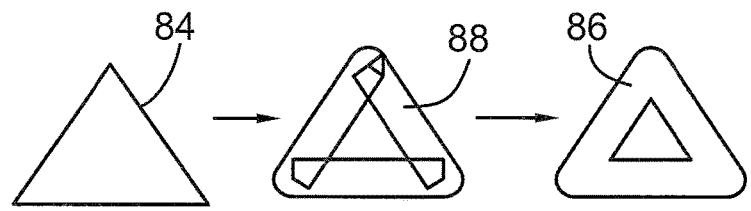
FIG. 9 shows the widening algorithm using a variable pen-wide shape drawing algorithm.
Figure 10:
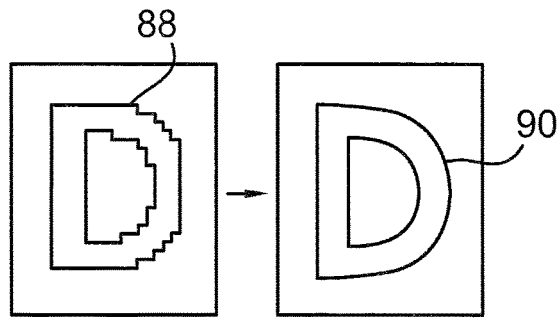
FIG. 10 is an example of applying a polygon smoothing algorithm.

The process of combining and detecting the die-cut 14 of a collection of vector graphic assets having vector information in one sticker 10 is shown in FIG. 8 which follows the following series of steps:

Obtain a geometry path (vector) for all shapes in the sticker 10.
Combine the geometry vectors of all shapes to form a combined geometry vector by applying a union operation 80 on all the vectors using geo API methods.
Combine the die-cut vectors of all shapes.
Widen 82 the combined geometry vector with the offset argument to apply the offsetting of the die-cut specified by the combined die-cut vector. The widening algorithm illustrated in FIG. 9 uses a variable pen-wide shape 84 drawing algorithm to draw the shape using the corresponding width 86 determined by the offset 88.
Detect and eliminate any unnecessary internal shapes defined by the combined geometry vector by examining each shape against the set of shapes (die-cuts) and sticker requirements.
Simply the combined geometry vector by applying a simplification algorithm if the combined geometry vector is too complex.
Finalize the shape 92.

e. Die-Cut as a Template

It is possible in the system to use any die-cut object either a free-form die-cut or an asset-related die-cut with any assets as the template for the sticker being produced. This allows for a templated approach where the user is provided with a set of templates of die-cut to choose from and which will become the background template for the sticker that contains the die-cut layer.

Figure 11:
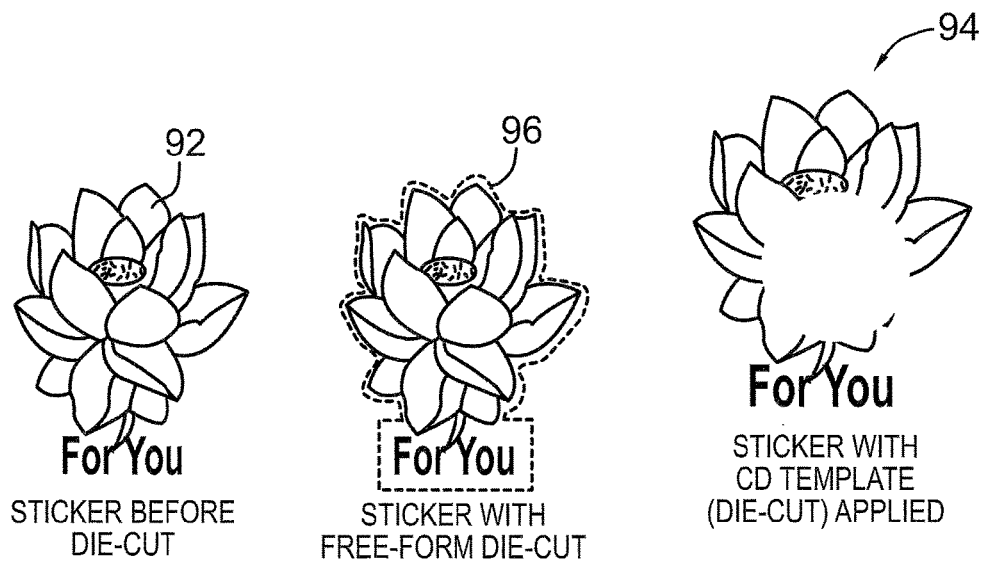
FIG. 11 illustrates an example of a sticker morphed into any shape or template.

An example of this approach is illustrated in FIG. 11. This approach can be done in two fashions:

a. Early-bound templated stickers: The sticker 92 is created with the die-cut template 94 (layer) as the first layer of the sticker 92. The sticker 92 is then bound by the template and all the assets thrown into the sticker 92 will be bound by the die-cut layer 94.
b. Late-bound stickers: the sticker 92 when created is not bound to any die-cut template 94 and will follow free form 96. At the end of the process of creation (or during the process of creation), a die-cut template 94 is assigned to the sticker 92 and at this point the sticker 92 becomes bound to the die-cut 96 and any free-form die-cuts will not take any effect.

This approach allows the sticker 92 to morph into any shape or template and not only follow its free form shape.

f. Asset Protection

All assets high resolution images are stored in binary format on the server. All external access to the assets are done through a proxy called "Resource Manager". The resource manager will always return a lower resolution images to the external caller (including tier 1). The lowering of the resolution is done in 2 ways:

a. Low-res pixels per image: the resource manager will never exceed a threshold of accessing pixels per image. For example if the threshold is 50%, any asset accessed with a size of more than 50% of the asset size will be considered a high resolution and will not be allowed. As such the second method will be used to return a low-res image.
b. Low-res bytes per pixel: used mainly when the caller is accessing a higher than the threshold pixels per image for the asset. In this case the returned asset contains the required pixels per image but with lowered bytes per pixel.

For example, if the high-res threshold is 50% and the asset size is: 1275×1650, an external caller can get a version of the asset up to 637×825 with the same amount of bytes per pixels (generally 3 bytes/pixel). If the caller is asking for a higher resolution (say 1000×1000), the resource manager will return an image of 1000×1000 of size but with 8 or 16 bits per pixel.

This technique will protect the original asset from being exposed to any external interface and thus provides full protection to the asset from any piracy.

g. Sticker State Management

Figure 12:
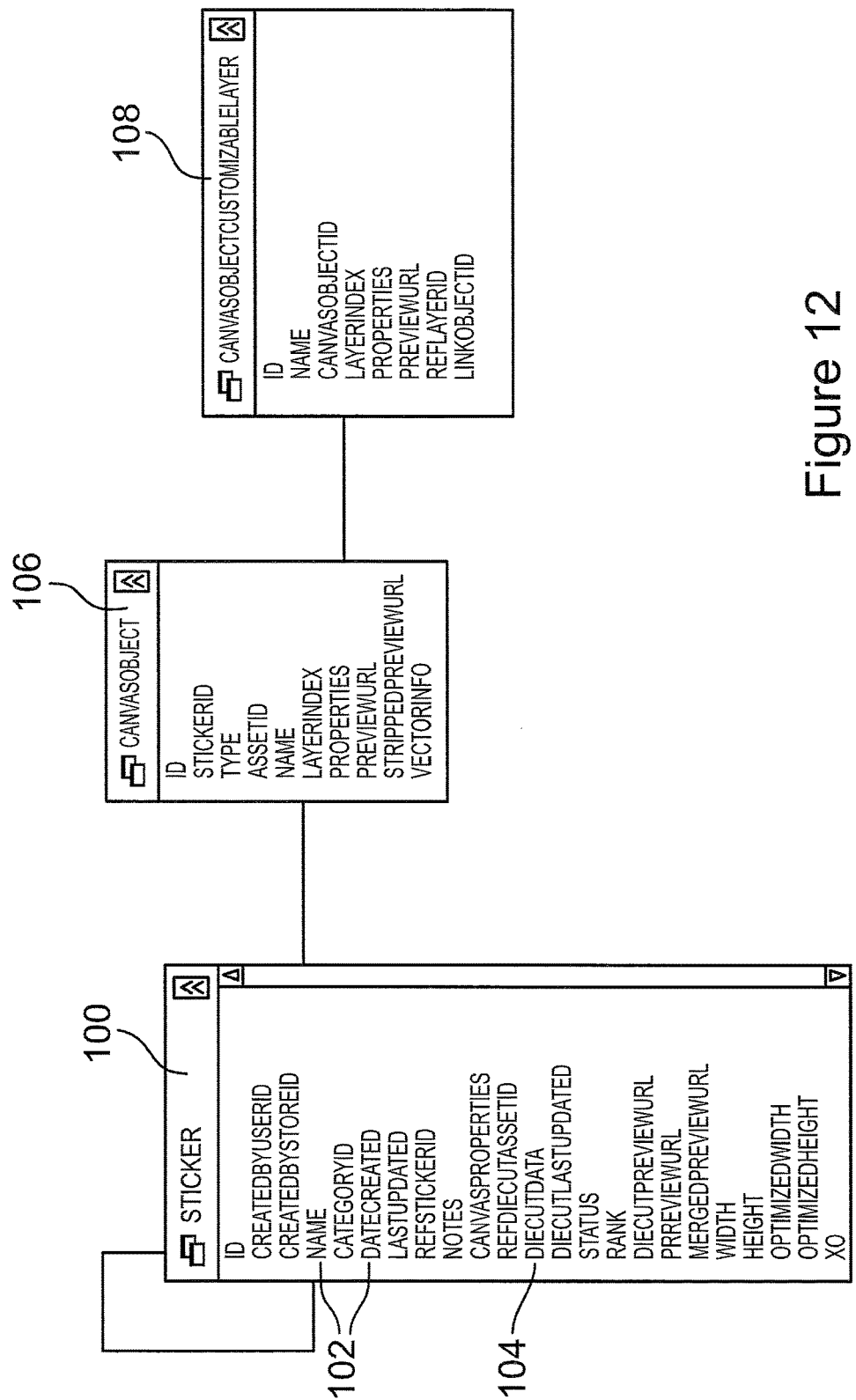
FIG. 12 illustrates a database schema of how the sticker is stored.

All stickers are stored as XML data which contains the meta data describing the sticker and its composition of assets and customizable layers. FIG. 12 illustrates a database schema of how the sticker is stored.

a. The sticker meta data is stored as a unique record (Sticker) 100 which contains a description 102 of the sticker, its direct properties (width, height, x, y, owner, etc) and also contains the final die-cut 104 of the sticker.

b. Every asset part of the sticker layers is stored in (CanvasObject) 106 which refers to the asset used for this layer.
c. Any non-asset layer is also stored as a (CanvasObject) 106 but without referring to an asset.
d. Any customizable layer part of an asset which is part of a layer of the sticker is copied over to (CanvasObject-CustomizableLayer) 108 and which contain the customization parameters within it.

h. External Interface Service

This component of the system is responsible for serving Tier 1 (user interface) or any external interface. It is the gateway to all the functionality and interfaces of the system's Tier 2 (server 16).

i. Checkout and Ordering Process

In the preferred method and system of the present invention, the Checkout Process consists of the following steps:
a. Preview Order;
b. Registration;
c. Shipping Address;
d. Payment;
e. Order Confirmation; and
f. Search.

a. Preview Order

Previewing an order is the first step of the checkout process of the preferred method and system of the present invention. The programming processes in this section include the following:
a. Remove Page: This function enables a user to remove a selected page from the current shopping cart.
b. Edit Page: This function is used to redirect the user to the Sticker Designer Tool. When a user selects a page, an event is triggered sending the value of the primary key for the selected page. This value is sent as a parameter to the designer tool indicating that the user would like to modify this page.
c. Add More Pages: This function is used to redirect the user to a search page in which sticker pages are populated from a database.
d. Detect Overlap: This function is used to detect overlaps between stickers on a page of the order. The first step in this process is to detect the stickers on the page and for each sticker, the system detects the die-cut points (these are kept in an array of points). The next step is to combine the geometries of the stickers by taking their intersections. If the result returns a new area, this means that there is an overlap between stickers on the page and a warning message will be displayed on the screen. Otherwise, there is no overlap and the user can continue the checkout process.
e. Fix Overlap: This function is used to fix any detected overlap on the page. It creates a new series of pages and fills them with the existing stickers.

b. Registration

After a page is created, the user can start the checkout process. If the user is already logged in, the user will be redirected to the Shipping Address page; otherwise the user will be redirected to the Sign-In or Registration page.

If the user has an account, the user can sign in and continue the checkout process. However, if the user is a new user and does not have an account, a popup will appear asking the user to enter the user's first name, last name and email address to register an account. After registering, the user will receive an email providing the user with a username and password for the next visit to the site.

After creating an account, the user is redirected to the next step of the checkout process, which is the Shipping Address page.

c. Shipping Address

In this step of checkout, the user is able to create a new shipping address or select an address from the addresses saved in the user's account.

d. Payment

In this stage, the user can select the following options:
a. Shipping Method: Examples of options for shipping include: Standard and Express. Depending on where the order is being shipped to, for example Canada or the USA, the estimated shipping date and price will be different.
b. Payment Method: Examples of payment options include Visa, MasterCard and AMEX as the credit card being accepted.
c. Billing Address: The Billing address can be different or the same as shipping address. The Tax value can be different based on the country and Province/State of the billing address. In addition, the tax calculation may be different depending on the country and/or province/State of the billing address.
d. Payment Services: Examples for payment Service: PayPal Direct Payment and eSelect Plus. Each of these payment services have a class that includes the following methods:
  i. Purchase—The main aspect of this function is to get all the required information such as user shipping and billing information, credit card and Payment details information and which is back to the selected service. After the system sends the information, the related service will return a response which contains the error list and the transaction number.
  ii. Refund Transaction—This function will get the Transaction number to be sent to the related service in which the transaction status will be changed to "refund".
  iii. Check For Errors—This function will get the response and if there is an error, it will return the error message(s).

e. Order Confirmation

Figure 13:
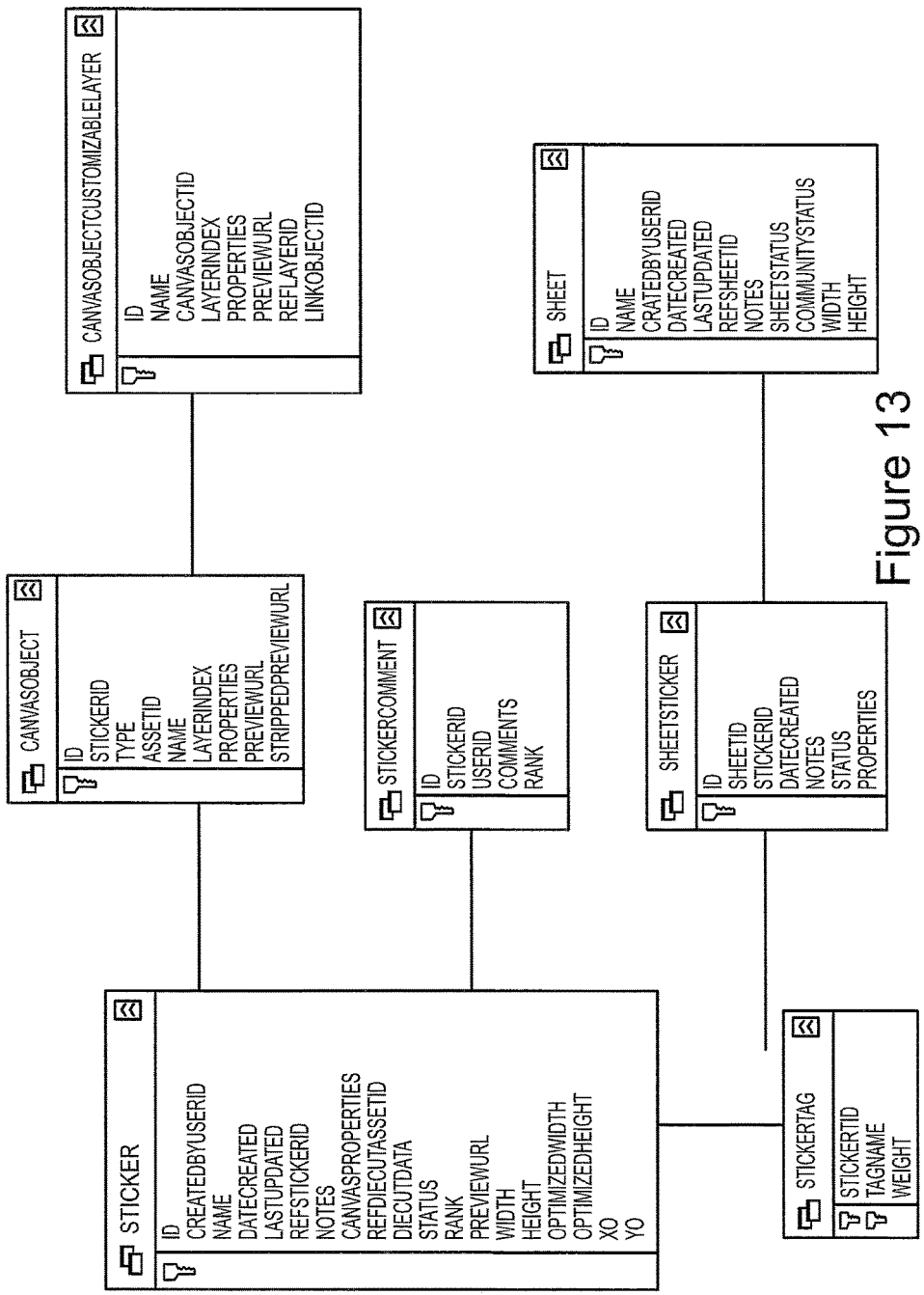
FIG. 13 is a diagram illustrating the meta data describing the sheet information used in Order Confirmation of one preferred embodiment of the method and system of the present invention.

Placing orders: In this process, the system (server 16) will have a meta data describing what the sheet contains and what other processes were incurred on each sticker. The meta data describing the sheet information is shown in FIG. 13.

The process is to serialize the order data into xml form that can be stored as a string data. After the order is placed successfully, an order confirmation is sent to the user, which includes the details of the order.

f. Search

Search is a quick way to find stickers and add or remove them from the current order. Users can search for stickers in three different ways: Themes, Tags and Brands.
a. Themes are collections of images under a specific name such as Signs, Fashion, and Travel.
b. Tags are lists of tag name specified for stickers at upload.
c. Brands are lists of all existing brands stored in the system.

A user is able to add or remove the selected sticker to or from the current page of the order by clicking on "add to page" or "delete from page".

By clicking on the sticker, a popup will appear which has the following functionality:
a. Add to page: This function adds the sticker to the current page.
b. Add to album: This functional enables the user to add the selected sticker to their selected album.
c. Email to a friend: This function is used to send the selected sticker to the friend.
d. Add to collection: This function will add the selected sticker to the user's collection album.
e. Rank: This function is used to give a rank to the selected sticker.

Tier 3: The Printer Service Application

This application is responsible for the production of the final product. Its primary purpose is to produce a high-quality sticker with the generated die-cut for each sticker within each sheet which is part of an order. The second purpose of this application is production cost effectiveness, speed, and quality control and assurance.

a. Accessing Assets and Sticker Data:

This application will access all the high resolution assets directly in its raw binary format. Since this application is not exposed to any external use, it is safe for the application to access the high-res protected assets directly and without the proxy "Resource Manager". This paradigm ensures the highest quality in producing the final stickers on the printer.

b. Batch Orders into Workload/Workload Production

Figure 14:
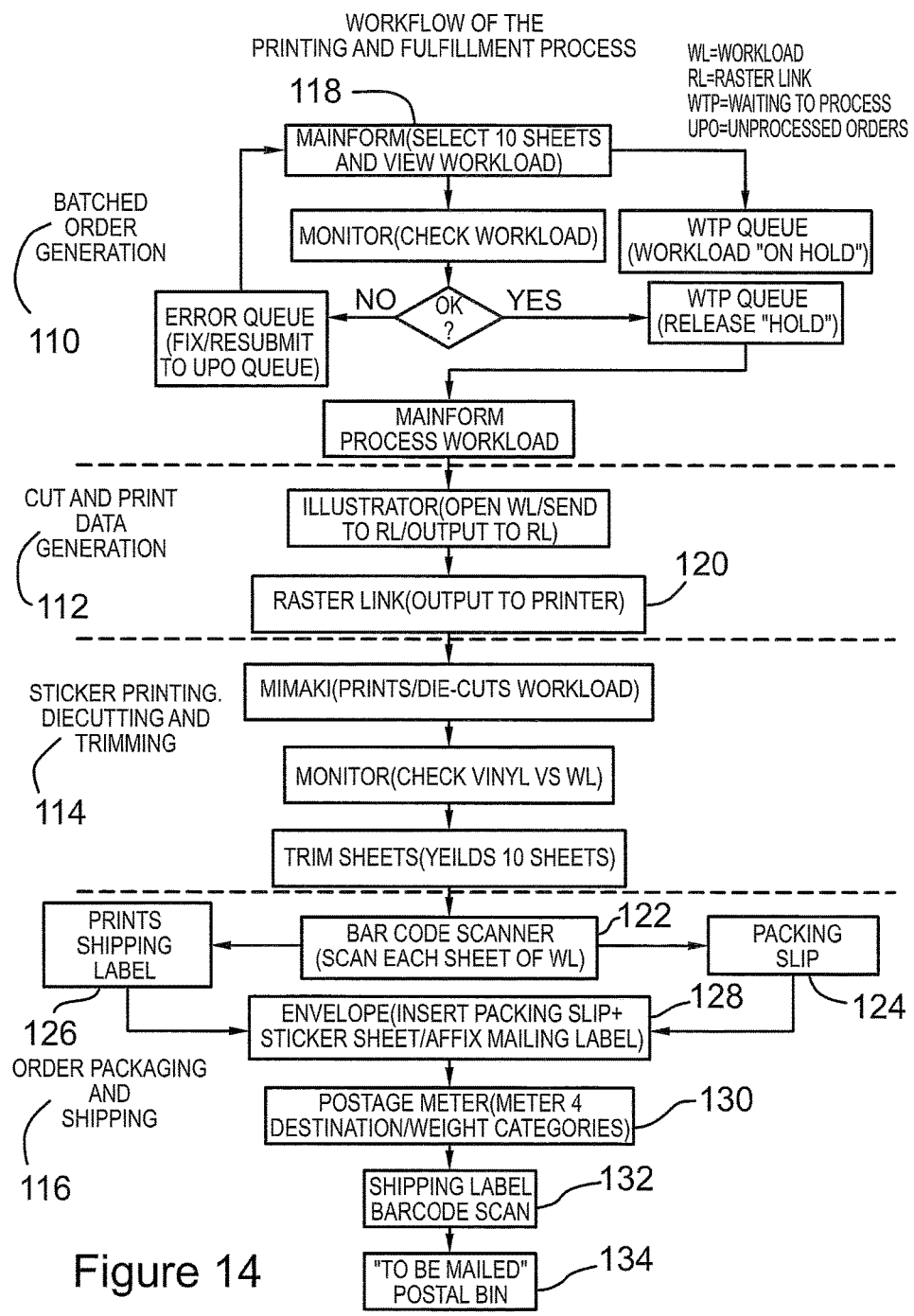
FIG. 14 illustrates the workflow of the four stages of the Printing and Fulfillment process of one preferred embodiment of the method and system of the present invention.

FIG. 14 illustrates the workflow of the Printing and Fulfillment process. During the Printing and Fulfillment phase of the preferred method and system of the present invention, sticker-sheet orders are grouped into "batches" of 10 sheets. They are then "RIPped," printed, die-cut, trimmed, barcode scanned, inserted into envelopes, addressed and metered for postage. This process can be divided into four main stages:
a. "Batched" Order Generation 110;
b. "Cut" and "Print" Data Generation 112;
c. Material Printing, Die-cutting and Trimming 114; and
d. Order Packaging and Shipping 116.

The preferred equipment utilized in each of these stages is listed below:
a. Batched Order Generation 110:
  i. Proprietary printer controller application;
  ii. Wide-screen monitor; and
  iii. Workload template file (Illustrator .ai file).
b. Cut and Print Data Generation 112:
  i. Adobe Illustrator application with "Fine Cut" plug-in; and
  ii. "Raster Link" application.
c. Material Printing, Die-cutting and Trimming 114:
  i. Mimaki Engineering large format printer/plotter;
  ii. Parallel Straightedge; and
  iii. T-Square.
d. Order Packaging and Shipping 116:
  i. Barcode scanner;
  ii. Laser printer;
  iii. Label printer; and
  iv. Postage meter.

The Printing and Fulfillment workflow commences when the operator launches the MAINFORM application 118, a user interface consisting of five queues.

In the preferred method and system of the present invention, function buttons are provided under two of the queues, allowing the operator to initiate viewing, batching and processing of the orders. The other three queues simply display the status of the batch as it moves through the various stages of production. The queues are named: Unprocessed Orders, Waiting to Process, Currently Processing, Processed and Packaged.

Figure 15:
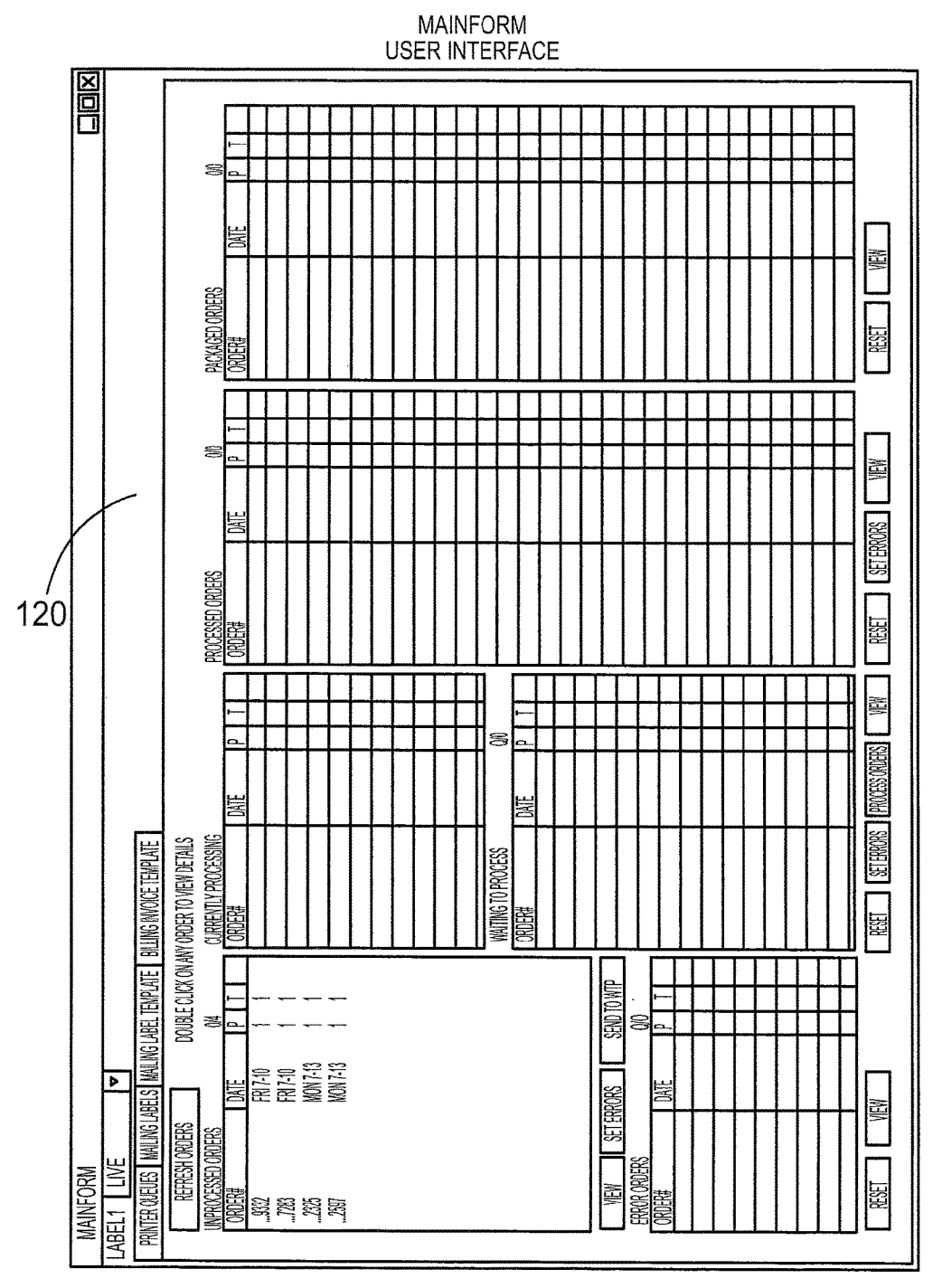

FIG. 15 shows an example of the user interface 120 for Mainform 118.

Batched Order Generation 110 begins when the operator selects orders totalling 10 sheets from the Unprocessed Orders queue. By selecting the VIEW function button, the operator initiates a script which generates a "workload number" for the batch and displays the orders on a wide screen monitor in "10-up" format—the way the sticker sheets will print on the roll-fed substrate. Mainform 118 utilizes a "10-up" template created in Adobe Illustrator to generate this display.

The operator checks the color, die-cut and licensing status of each order and then selects the PROCESS ORDERS function button from the Waiting to Process queue. This initiates a second script, which directs Adobe Illustrator to render the 10 sheets into a "workload file," putting the "artwork" and the "die-cuts" on two separate layers and saving the file in Postscript format (e.g., .ai file format).

Cut and Print Data Generation 112 commences when the operator opens the "workload file" in Adobe Illustrator, which has the Mimaki "Fine Cut" plug-in installed. This plug-in "reads" the Illustrator file's "print" and "cut" layers, and via the "Output to Raster Link" function button, generates an .eps file for each layer and passes the data to the Raster Link application 120.

The operator opens Raster Link 120, selects the "workload file" (now comprised of one .eps for the printing data and one for the cutting data) and initiates sequential "RIP, print and diecut" functions via the "Cut after RIP and print" menu command.

Material Printing, Die-cutting and Trimming 114 commences after Raster Link 120 finishes "RIPping" the Postscript data generated by Fine Cut. It sends "machine data" to the printer to control the operation of the print head and the cutting head. First, the artwork is printed. The operator can control the quality and speed of the output with the resolution, "number of passes" and "print head speed" settings in Raster Link 120. Smearing of the ink is prevented by the use of internal heaters, which quick-dry the solvent-based inks. After printing finishes, the "carriage" switches from the print head to the cutting head, roller pressure settings are adjusted and heaters are turned off. The material is automatically rolled back to the printing origin point and die-cutting commences. Accurately registered "contour die-cutting" is achieved through the cutting head's laser pointer system, which detects the "x" and "y" coordinates of register marks around the perimeter of the image area.

After the material is printed and die-cut, the machine's automatic sheet trimmer cuts the sheet off the roll and it drops into the media catch bin. The operator places the sheet on the viewing booth and checks the content and color of the output against the visual display of the workload. A VIEW button under the Processed Orders queue allows the operator to select the processed workload and display it.

The operator then secures the material to the surface of a drafting table and cuts it into ten letter-sized sheets, utilizing a parallel straightedge for the horizontal cuts and a T-square for the vertical cuts. The sheets are stacked on the Packaging Table, awaiting the final stage of production.

Order Packaging and Shipping 116 commences with the piling of empty mailing envelopes on the Packaging Table (next to the stacked vinyl sheets). The operator selects the "Mailing Label" tab from the Mainform 118 application, and uses the barcode scanning gun 122 to scan the barcode on each of the ten sticker sheets. Mainform 118 prints out a "templated" Packing Slip 124 and a Mailing Label 126, populating the "address, cost, mail service, order number and number of sheets" fields with the barcode-encoded data captured by the website at the time of purchase.

The sticker sheets and packing slip are inserted into the envelope 128, the shipping label 126 is affixed to the envelope 128 and the operator puts the envelope into one of four compartments in the "To Be Metered" bins (each compartment represents one of two destinations and one of two weight classes).

After all workloads for the day have been printed, die-cut, trimmed and inserted—the envelopes 128 are metered for postage 130 by "destination and weight" and placed in a "To Be Mailed" bin 134. Before mailing, the barcodes on the shipping labels are scanned 132. The data is sent to a Reconciliation Sheet, which the operator prints off and compares with data from the postal meter. This verifies that the number of orders processed equals the number to be shipped.

The envelopes are brought to a Postal Station for mailing. This concludes the Printing and Fulfillment 116 segments of the Sticker Production System.

Figure 16:
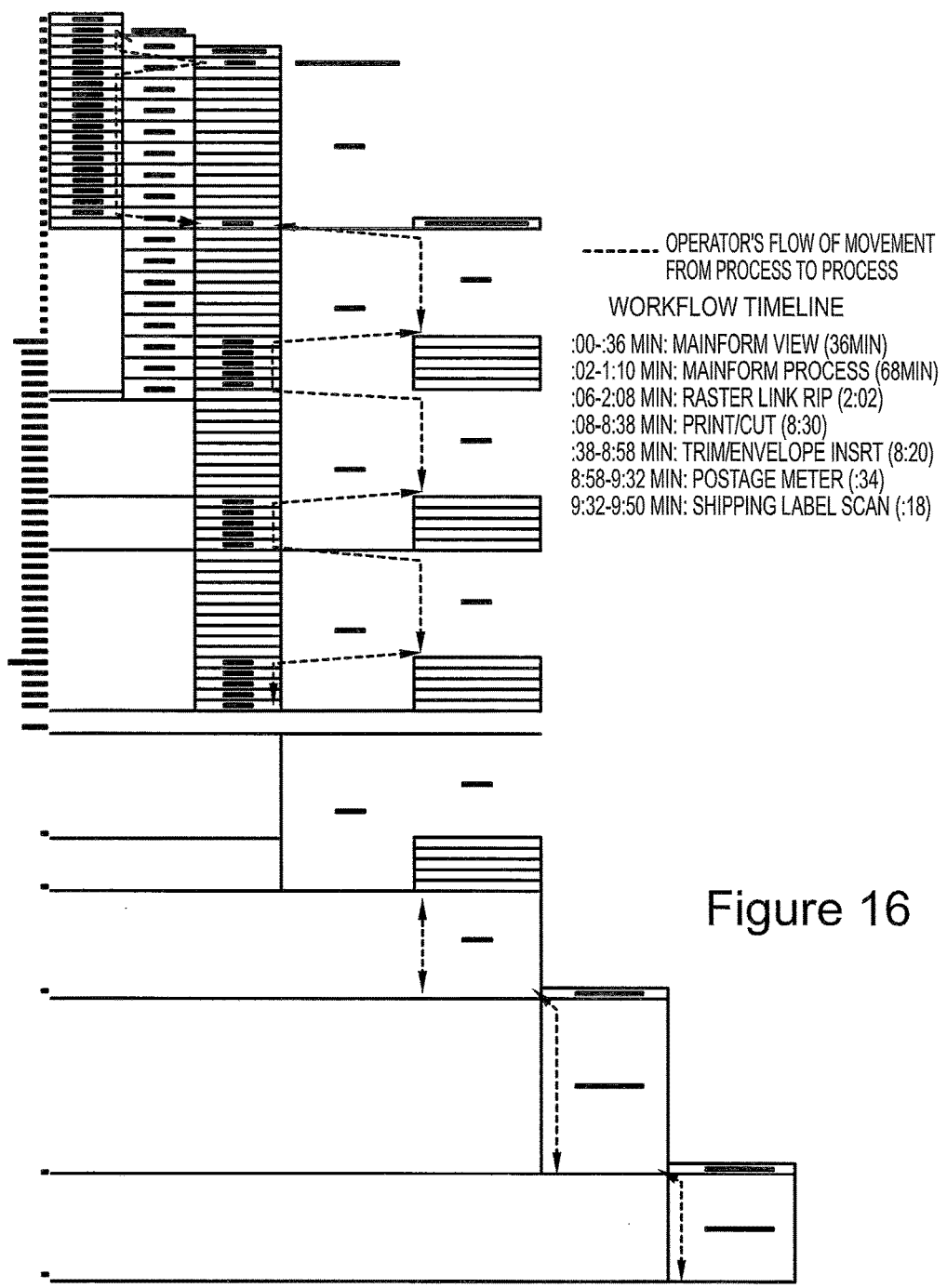
FIG. 16 illustrates the workflow timeline of one preferred embodiment of the method and system of the present invention.

Although the four stages of the Printing and Fulfillment workflow have been described sequentially, they actually occur concurrently, which maximizes sticker production. The queues that perform workload viewing and processing, Raster Link RIPping and workload printing are therefore idle for only a small amount of time over the course of processing consecutive workloads. FIG. 16 illustrates this.

Print times are relatively fixed. Bi-directional "12-pass" printing, at a resolution of 540×1080 progresses at the speed of 4 linear inches (by 60" wide) per minute. A 10-sheet workload prints in about 8 minutes. Raster Link RIPs a workload in 2 minutes, but it does so at the same time as the previous workload is printing. So, no printing or cutting time is "lost" to RIP time.

Production throughput is governed by two main factors:
 a. Path-generation time in Mainform (which, itself, is determined by two other factors); and
 b. Path-cutting time at the printer/plotter.

Since each sticker is die-cut individually, total die-cutting time is determined by the number of stickers in the workload and the complexity of the die-cut path. More complex paths take longer to generate and cut. This explains the variability of Mainform "Processing" times and Raster Link "RIPping/Printing/Die-cutting" times mentioned below.

Path complexity is a function of the number of points per path and the number of curved (versus angular) segments on the path. Since the media feed motor and the cut-head carriage motor must move for each point on a path, the quickest cutting paths are those with the fewest number of points and the fewest angular segments.

Achieving a balance between an aesthetically pleasing die-cut (one that follows the contour of the artwork) and one that cuts quickly (maximizing throughput) required testing various path shapes and complexities. After simplifying die-cut paths to as few points as possible (15-50 points, depending upon the artwork's contours) while maintaining fidelity to those contours, it was determined that the achievable time per sticker die-cut is between 5-8 seconds. For an "average" sticker sheet containing 15 stickers, a workload of 10 sheets (150 stickers) takes 20 minutes to cut (1200 seconds-8 sec/die-cut×150 die-cuts).

The die-cut paths are initially generated using Illustrator's "Live Trace" feature. An artist optimizes the path by reducing the number of points and angular segments via the Object/Path/SIMPLIFY command.

Since there is a machine limitation for "art-to-die-cut" registration accuracy (0.5 mm), it was necessary to limit the amount of user-defined scaling that could be applied to a sticker so that this tolerance would not be compromised.

Testing resulted in a decision to limit the minimum "scaled" sticker size to 1" in height with a die-cut "offset" of 0.75 mm (the distance (in mm) from the edge of the artwork to the edge of the die-cut). At this size, die-cut misregistration can occur, but the die-cut will not cut through the artwork.

This meant creating die-cut "offsets" in the original artwork of 2½ mm (art is created at 4" high).

The following times were measured during multiple tests of sample 10-sheet workloads:
 a. Mainform "Viewing/Checking": 2 min per workload.
 b. Mainform "Processing": 4-12 minutes per workload.
 c. Raster Link RIPping: 2 minutes per workload.
 d. Printing: 8 minutes per workload.
 e. Die-cutting: 10-20 minutes per workload.
 f. Trimming/scanning/envelope insertion/labelling: 20 minutes per workload.
 g. Postage metering: 2 minutes per workload.
 h. Shipping label scanning: 1 minute per workload.

Process "totals" per 10-hour shifts:
 a. Mainform "Viewing/Checking": 34 minutes.
 b. Mainform "Processing": 68 min-3.5 hours.
 c. "RIPping"/printing/die-cutting: 8 hours.
 d. Trimming/scanning/envelope insertion/labelling: 5.75 hours.
 e. Postage metering: 34 minutes.
 f. Shipping label scanning: 17 minutes.

If one were to process each workload in its entirety before starting the next one, it would take 60-70 minutes, allowing only 10 workloads (100 sheets) to be produced in a 10-hour shift. The "concurrent-processes" workflow of the present invention enables 17 workloads (170 sheets) to be produced in the same amount of time.

It is to be understood that while certain embodiments the present invention have been described and illustrated, the present invention is not to be limited to the specific form or arrangement of parts herein described and shown. It will be apparent to those skilled in the art that various changes or modifications may be made without departing from the scope of the invention and the present invention is not to be considered limited to what is shown in the drawings and described in the specification.

What is claimed is:

1. A method, performed by a server, for making a sticker, the method comprising:
 receiving a raster image from a client device over a communications network;
 receiving input defining a size for the sticker from the client device over the communications network;
 performing pixel edge detection on the raster image to obtain a plurality of polygons corresponding to all closed shapes in the raster image;
 applying an offset to each polygon in the plurality of polygons, wherein the offset is between 0.5 mm and 2.0 mm;
 detecting and removing any polygons below a size threshold;
 combining the remaining polygons to form a single, combined polygon;
 detecting and removing any holes defined in an interior of the polygon;

applying a polygon smoothing algorithm to the polygon;
applying spline approximation to define the polygon as a set of one or more curves;
dynamically generating a die-cut border for the sticker in real-time in accordance with the set of one or more curves and received size so that the die-cut border has a shape defined by the set of one or more curves and the received size;
printing the raster image on a sticker sheet in accordance with the received size and the offset so that the printed image has a printed size equal to the received size less the offset; and
die-cutting the sticker sheet in accordance with the die-cut border.

2. The method of claim 1, wherein the spline approximation is Bezier spline approximation and the curves are Bezier curves.

3. The method of claim 1, further comprising:
receiving input from the client device over the communications network, the input selecting one or more vector graphics;
generating an image asset comprising the raster image and the one or more vector graphics;
obtaining a die-cut vector of each vector graphic having a pre-defined die-cut;
combining the die-cut vectors to form a single, combined die-cut vector; and
applying the offset to the combined die-cut vector to obtain a modified die-cut vector;
wherein dynamically generating the die-cut border comprises merging the set of one or more curves and the modified die-cut vector to obtain the die-cut border, wherein the shape of the die-cut border is defined by the result of merging the set of one or more curves and the modified die-cut vector.

4. The method of claim 3, wherein combining the geometry vectors to form the combined die-cut vector comprises:
detecting and removing internal shapes defined by the combined die-cut vector.

5. The method of claim 3, further comprising:
applying a simplification algorithm to the modified die-cut vector.

6. The method of claim 3, further comprising:
determining a rectangular vector defining an outbound rectangle for each vector graphic that does not have a pre-defined die-cut;
combining the rectangular vectors to form a combined rectangular vector;
applying the offset to the combined rectangular vector to form a modified rectangular vector;
wherein dynamically generating the die-cut border comprises merging the set of one or more curves, the modified die-cut vector and the modified rectangular vector to obtain the die-cut border, wherein the shape of the die-cut border is defined by the result of merging the set of one or more curves, modified die-cut vector and modified rectangular vector.

7. A method, performed by a server, for making a sticker, the method comprising:
receiving input from a client device over a communications network, the input selecting one or more vector graphics;
generating an image asset comprising the one or more vector graphics;
receiving input defining a size for the sticker from the client device over the communications network;
obtaining a die-cut vector of each vector graphic having a pre-defined die-cut;
combining the die-cut vectors to form a single, combined die-cut vector;
applying an offset to the combined die-cut vector to obtain a modified die-cut vector;
determining a rectangular vector defining an outbound rectangle for each vector graphic that does not have a pre-defined die-cut;
combining the rectangular vectors to form a combined rectangular vector;
applying the offset to the combined rectangular vector to form a modified rectangular vector;
merging the modified die-cut vector and the modified rectangular vector;
dynamically generating a die-cut border for the sticker in real-time in accordance with the result of merging the modified die-cut vector and the modified rectangular vector and the received size so that the die-cut border has a shape defined by the result of merging the modified die-cut vector and the modified rectangular vector and a size defined by the received size;
wherein the vector graphics having a pre-defined die-cut comprise vector graphic images and the vector graphics that do not have a pre-defined die-cut comprise vector graphics text;
printing the image asset on a sticker sheet in accordance with the received size information and the offset so that the printed image has a size equal to the received size less the offset; and
die-cutting the image asset on the sticker sheet in accordance with the die-cut border.

8. A system for making stickers, comprising:
a server comprising a memory and a processor coupled to the memory, wherein the memory has stored executable instructions that, when executed by the processor, cause the server to:
receive a raster image from a client device over a communications network;
receive input defining a size for the sticker from the client device over the communications network;
perform pixel edge detection on the raster image to obtain a plurality of polygons corresponding to all closed shapes in the raster image;
apply an offset to each polygon in the plurality of polygons, wherein the offset is between 0.5 mm and 2.0 mm;
detect and remove any polygons below a size threshold;
combine the remaining polygons to form a single, combined polygon;
detect and remove any holes defined in an interior of the polygon;
apply a polygon smoothing algorithm to the polygon;
apply spline approximation to define the polygon as a set of one or more curves; and
dynamically generate a die-cut border for the sticker in real-time in accordance with the set of one or more curves and the received size so that the die-cut border has a shape defined by the set of one or more curves and a size defined by the received size;
a printer coupled to the first computing device for printing the raster image on a sticker sheet in accordance with the received size and offset so that the printed image has a size equal to the received size less the offset; and a die-cutter coupled to the first computing device for die-cutting the sticker sheet in accordance with the die-cut border.

9. The method of claim 3, wherein the vector graphics having a pre-defined die-cut comprise vector graphic images and the vector graphics that do not have a pre-defined die-cut comprise vector graphic text.

\* \* \* \* \*

UNITED STATES PATENT AND TRADEMARK OFFICE
CERTIFICATE OF CORRECTION

PATENT NO. : 10,192,222 B2
APPLICATION NO. : 12/750078
DATED : January 29, 2019
INVENTOR(S) : Witkin et al.

Page 1 of 1

It is certified that error appears in the above-identified patent and that said Letters Patent is hereby corrected as shown below:

In the Claims

In Column 22, Claim 8: Line 63 currently reads "a printer coupled to the first computing device for". Please correct this to read "a printer coupled to the server for"

In Column 23, Claim 8: Line 1 currently reads "a die-cutter coupled to the first computing device for". Please correct this to read "a die-cutter coupled to the server for"

Signed and Sealed this
Thirtieth Day of April, 2019

Andrei Iancu
*Director of the United States Patent and Trademark Office*